US 8,028,083 B2

(12) United States Patent
Audebert et al.

(10) Patent No.: US 8,028,083 B2
(45) Date of Patent: Sep. 27, 2011

(54) METHOD AND SYSTEM FOR REMOTE ACTIVATION AND MANAGEMENT OF PERSONAL SECURITY DEVICES

(75) Inventors: Yves Louis Gabriel Audebert, Los Gatos, CA (US); Olivier Clemot, Rueil-Malmaison (FR)

(73) Assignee: Activcard Ireland, Limited, Dublin (IE)

( * ) Notice: Subject to any disclaimer, the term of this patent is extended or adjusted under 35 U.S.C. 154(b) by 994 days.

(21) Appl. No.: 10/476,329

(22) PCT Filed: Apr. 9, 2002

(86) PCT No.: PCT/EP02/03930
§ 371 (c)(1),
(2), (4) Date: Oct. 29, 2003

(87) PCT Pub. No.: WO02/091316
PCT Pub. Date: Nov. 14, 2002

(65) Prior Publication Data
US 2004/0148429 A1 Jul. 29, 2004

Related U.S. Application Data

(63) Continuation-in-part of application No. 09/844,246, filed on Apr. 30, 2001, now abandoned, and a continuation-in-part of application No. 09/844,272, filed on Apr. 30, 2001, now Pat. No. 7,225,465, and a continuation-in-part of application No. 09/844,439, filed on Apr. 30, 2001, now Pat. No. 7,363,486.

(51) Int. Cl.
*G06F 15/173* (2006.01)
*G06F 15/16* (2006.01)
(52) U.S. Cl. .................................. 709/238; 709/245
(58) Field of Classification Search .............. 705/53, 705/77; 709/238
See application file for complete search history.

(56) References Cited

U.S. PATENT DOCUMENTS
5,276,735 A * 1/1994 Boebert et al. ............... 713/167
(Continued)

FOREIGN PATENT DOCUMENTS
CA 2 330 534 12/1999
(Continued)

OTHER PUBLICATIONS

T. Ebringer, et al.; "Parasitic Authentication to Protect Your E-Wallet," Computer, IEEE Computer Society Long Breach, CA, US, US, vol. 33, No. 10, Oct. 1, 2000, XP001001747, ISBN: 0018-9162, pp. 54-60.

(Continued)

*Primary Examiner* — Jeffrey Pwu
*Assistant Examiner* — Shaq Taha
(74) *Attorney, Agent, or Firm* — Muirhead and Saturnelli, LLC

(57) ABSTRACT

The present invention provides a method for activating and/or managing at least one Personal Security Device PSD (2040) with at least a first Remote Computer System (2050) over a first network (2045) using at least one Client (2010) as a host to said at least one PSD (2040), said method comprising the steps of: a) establishing at least one communications pipe (2075) over said first network (2045) between said at least one PSD (2040) and said at least first Remote Computer System (2050), b) retrieving proprietary information (I) by said at least first Remote Computer System (2050) from a remote storage location (2165), c) transmitting said proprietary information (I) from said at least first Remote Computer System (2050) said at least one PSD (2040) through said at least one communications pipe (2075), and d) storing and/or processing said proprietary information (I) in said at least one PSD (2040).

26 Claims, 19 Drawing Sheets

U.S. PATENT DOCUMENTS

Figure 1:
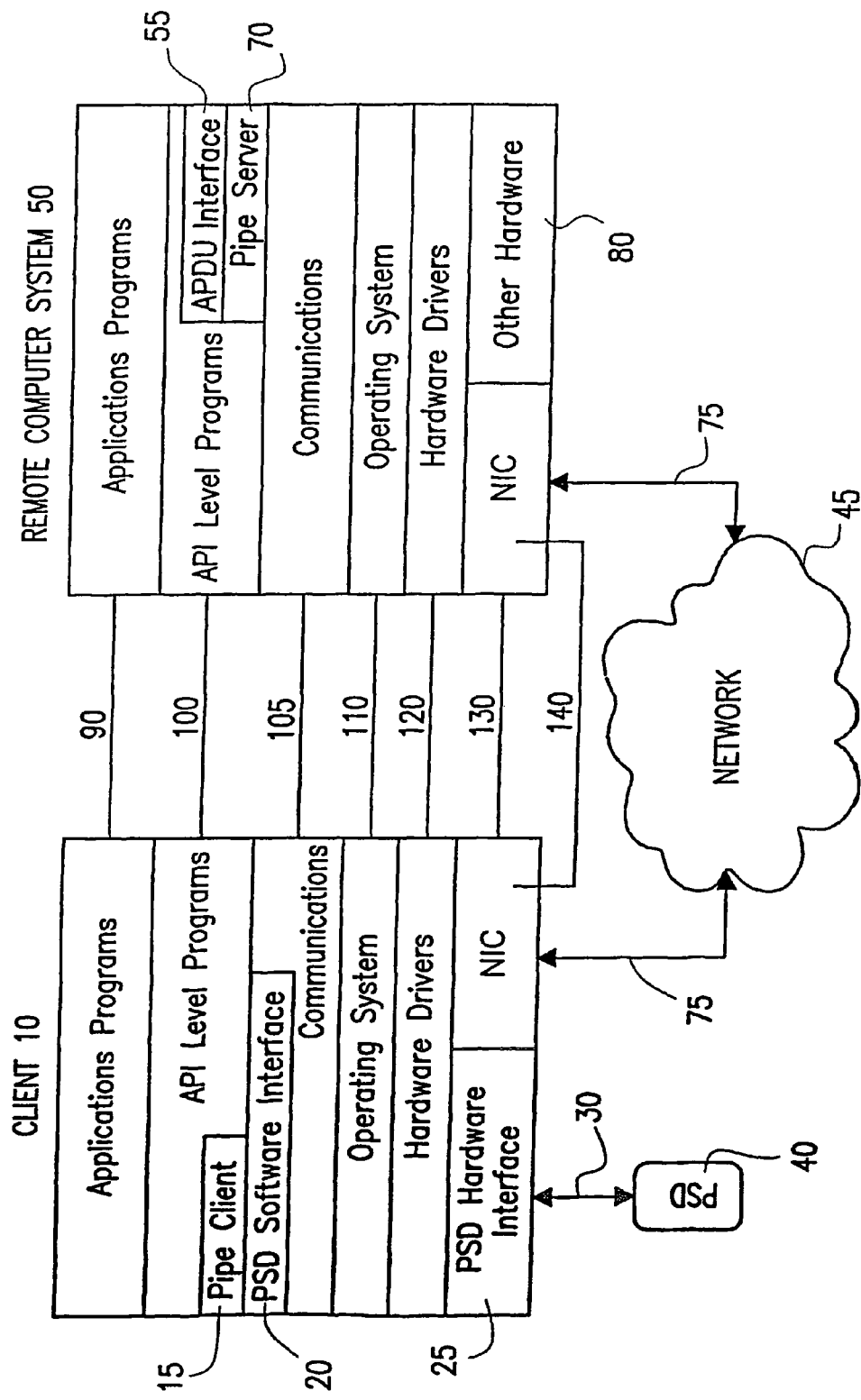

| | | | | |
|---|---|---|---|---|
| 5,455,863 | A | * | 10/1995 | Brown et al. ............... 380/247 |
| 5,499,297 | A | * | 3/1996 | Boebert ..................... 713/159 |
| 5,761,309 | A | | 6/1998 | Ohashi et al. |
| 5,778,071 | A | | 7/1998 | Caputo et al. |
| 5,880,769 | A | * | 3/1999 | Nemirofsky et al. ......... 725/139 |
| 5,917,168 | A | | 6/1999 | Nakamura et al. |
| 5,944,821 | A | | 8/1999 | Angelo |
| 5,991,407 | A | | 11/1999 | Murto |
| 6,005,942 | A | | 12/1999 | Chan et al. |
| 6,018,779 | A | | 1/2000 | Blumenau |
| 6,061,730 | A | * | 5/2000 | Billings ..................... 709/231 |
| 6,101,254 | A | | 8/2000 | Thiriet |
| 6,101,255 | A | | 8/2000 | Harrison et al. |
| 6,105,008 | A | * | 8/2000 | Davis et al. ................. 705/41 |
| 6,108,789 | A | | 8/2000 | Dancs et al. |
| 6,128,338 | A | | 10/2000 | Behaghel et al. |
| 6,131,811 | A | | 10/2000 | Gangi |
| 6,144,671 | A | | 11/2000 | Perinpanathan et al. |
| 6,181,735 | B1 | | 1/2001 | Sarat |
| 6,192,473 | B1 | | 2/2001 | Ryan, Jr. et al. |
| 6,195,700 | B1 | | 2/2001 | Bender et al. |
| 6,196,459 | B1 | * | 3/2001 | Goman et al. ............... 235/380 |
| 6,202,155 | B1 | * | 3/2001 | Tushie et al. ............... 726/20 |
| 6,233,683 | B1 | | 5/2001 | Chan et al. |
| 6,279,047 | B1 | | 8/2001 | Bublitz et al. |
| 6,385,729 | B1 | | 5/2002 | DiGiorgio et al. |
| 6,434,238 | B1 | | 8/2002 | Chaum et al. |
| 6,481,632 | B2 | * | 11/2002 | Wentker et al. ............. 235/492 |
| 6,575,360 | B1 | | 6/2003 | Hagn |
| 6,602,469 | B1 | | 8/2003 | Maus et al. |
| 6,694,436 | B1 | * | 2/2004 | Audebert ................... 713/200 |
| 6,718,314 | B2 | | 4/2004 | Chaum et al. |
| 6,751,671 | B1 | | 6/2004 | Urien |
| 6,807,561 | B2 | | 10/2004 | Lagosanto et al. |
| 6,892,301 | B1 | | 5/2005 | Hansmann et al. |
| 6,931,381 | B1 | * | 8/2005 | Petit ......................... 705/53 |
| 6,944,650 | B1 | | 9/2005 | Urien |
| 6,993,131 | B1 | | 1/2006 | Meyers |
| 7,028,187 | B1 | | 4/2006 | Rosen |
| 7,046,810 | B2 | | 5/2006 | Takada et al. |
| 7,117,364 | B1 | | 10/2006 | Hepper |
| 7,325,052 | B1 | * | 1/2008 | Motoyama ................. 709/223 |
| 2001/0039587 | A1 | * | 11/2001 | Uhler et al. ................. 709/229 |
| 2001/0045451 | A1 | | 11/2001 | Tan et al. |
| 2002/0006132 | A1 | * | 1/2002 | Chuah et al. ............... 370/401 |
| 2002/0025046 | A1 | | 2/2002 | Lin |
| 2002/0040936 | A1 | | 4/2002 | Wentker et al. |
| 2002/0042875 | A1 | * | 4/2002 | Shukla ....................... 713/151 |
| 2002/0069340 | A1 | * | 6/2002 | Tindal et al. ............... 711/203 |
| 2003/0012190 | A1 | * | 1/2003 | Kaku et al. ................. 370/389 |
| 2005/0138186 | A1 | * | 6/2005 | Hesselink et al. .......... 709/229 |
| 2005/0216732 | A1 | * | 9/2005 | Kipnis et al. ............... 713/155 |

FOREIGN PATENT DOCUMENTS

| | | |
|---|---|---|
| DE | 19522527 | 1/1997 |
| DE | 19724901 | 12/1998 |
| DE | 195 22 527 | 4/2001 |
| DE | 199 47 986 | 4/2001 |
| EP | 0 895 204 | 2/1999 |
| EP | 0 911 722 | 4/1999 |
| EP | 0911772 | 4/1999 |
| EP | 0923211 | 6/1999 |
| FR | 2779018 | 11/1999 |
| WO | 96/34483 | 10/1996 |
| WO | 98/52150 | 11/1998 |
| WO | 98/52161 | 11/1998 |
| WO | 9852161 | 11/1998 |
| WO | 99/62210 | 12/1999 |
| WO | 9962037 | 12/1999 |
| WO | 9962210 | 12/1999 |
| WO | 0116900 | 3/2001 |
| WO | 0122373 | 3/2001 |
| WO | 01/59730 | 8/2001 |
| WO | 0159730 | 8/2001 |

OTHER PUBLICATIONS

Naomaru Itoi, et al., "Secure Internet Smartcards," CITI Technical Report 00-6, Program in Smartcard Technology, http://www.citi.umich.edu/projects/smartcard/, Center for Information Technology Integration, Aug. 24, 2000, 13 pages total.

International Search Report dated Mar. 9, 2002.

T. Ebringer, et al.; "Parasitic Authentication to Protect Your E-Wallet," Computer, IEEE Computer Society, Long Beach, CA, US, US, vol. 33, No. 10, Oct. 1, 2000, XP001001747, ISBN: 0018-9162, pp. 54-60.

International Search Report dated Aug. 23, 2002.

European Telecommunications Standards Institute: "Digital Cellular Telecommunications System (Phase 2+) (GSM); Universal Mobile telecommunications System (UMTS); Security Mechanisms for the (U) SIM application toolkit; Stage 2; (3GPP TS 23.048 version 4.1.0 Release 4)" ETSI TS 123 048 V4.1.0, Sep. 2001, pp. 1-35, XP002237189 ETSI Technical Specification.

"Digital Cellular Telecommunications System (Phase 2+) (GSM); Specification of the SIM Application Toolkit for the Subscriber Identity Module—Mobile Equipment (SIM—ME) Interface (GSM 11.14 version 8.3.0 Release 1999)" ETSI TS 101 267 V8.3.0, XX, XX, Aug. 2000, pp. 1-69, 114, 115, XP002222021.

ISO/IEC 7816-4: 1995/Amd.1:1997(E) Information technology-Identification cards-Integrated circuit(s) cards with contacts, Part 4: Interindustry commands for interchange, Amendment 1, pp. 1-5, Dec. 15, 1997.

ISO/IEC 7816-4: 1995(E) Information technology-Identification cards-Integrated circuit(s) cards with contacts, Part 4: Interindustry commands for interchange, pp. 1-46, Sep. 1, 1995.

U.S. Appl. No. 09/844,246 entitled "Method and System for Establishing a Remote Connection to a Personal Security Device", filed Apr. 30, 2001 by Y. Audebert, et al.

U.S. Appl. No. 09/844,439 entitled "Method and System for Authentication Through a Communications Pipe", filed Apr. 30, 2001 by Y. Audebert, et al.

Java Card 2.1 Application Programming Interface Sun Microsystems, Inc. Final Revision 1.1, Jun. 7, 1999.

International Search Report dated May 28, 2003.

Global Platform, Multi Application Smart Card Management Systems Global Platform Functional Requirements, Version 3.3, Nov. 2000, pp. 1-78.

Wolfgang Rankl, et al., "Handbuch der Chipkarten- Aufbau-Funktionsweise-Einsatz von Smart Cards," Handbook of Chip Cards Structure- Function-Use of Smart Cards 3 (German Edition), Global System for Mobile Communications—GSM, Auflage, 1999, pp. 689-690.

ETSI TS 101 181, v8.3.0, Digital cellular telecommunications system (Phase 2+), Security Mechanisms for the SIM application toolkit, Stage 2, GSM 03.48 version 8.3.0 Release 1999, Technical Specification, Aug. 2000, pp. 1-34, 65.

International Standard, ISO/IEC 7186-4, Information Technology-Identification cards—Integrated circuit(s) cards with contacts, Part 4: Interindustry commands for interchange, First Ed., Sep. 1, 1995, pp. ii-iv, 1-4, 39-40.

* cited by examiner

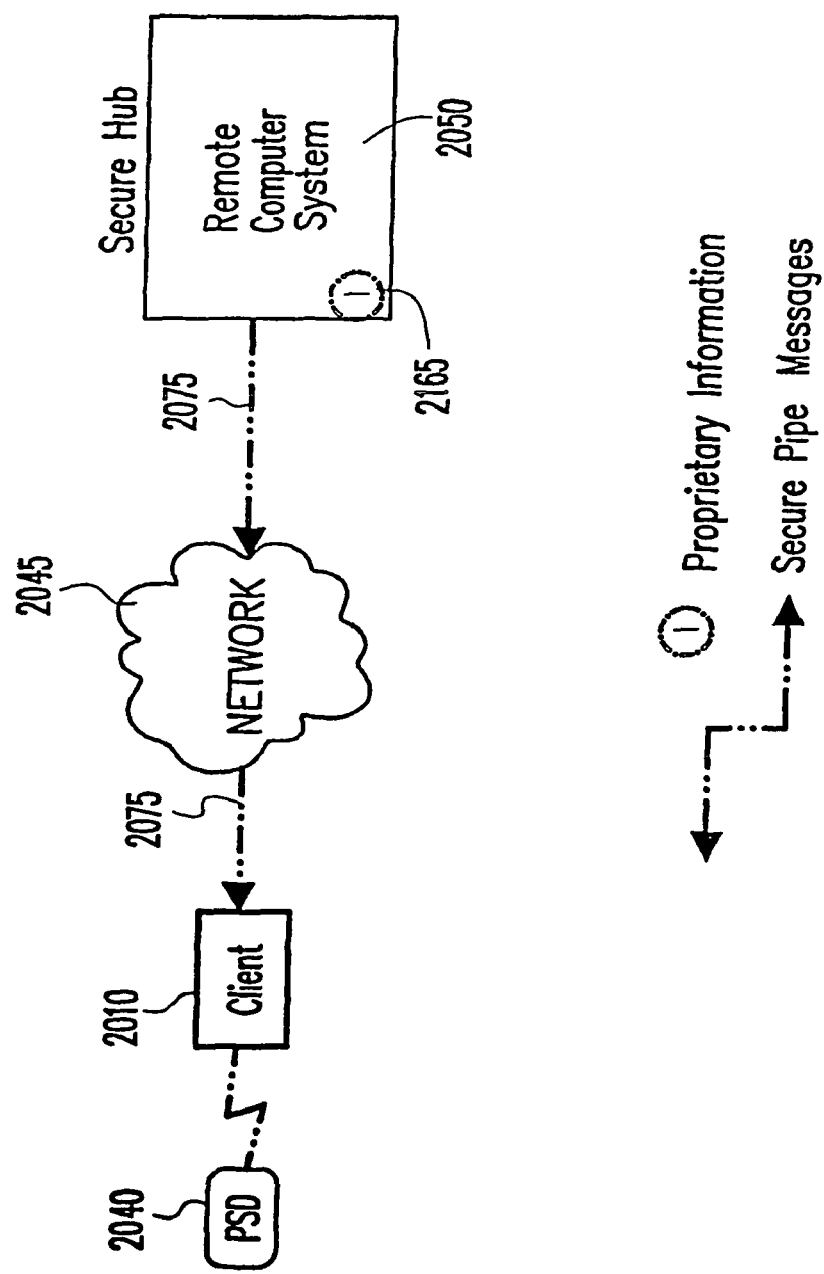

METHOD AND SYSTEM FOR REMOTE ACTIVATION AND MANAGEMENT OF PERSONAL SECURITY DEVICES

RELATED APPLICATIONS

This application is a 371 US National Stage application of PCT/EP02/03930 filed Apr. 9, 2002, which is a continuation-in-part of U.S. application Ser. No. 09/844,246 filed Apr. 30, 2001, now abandoned, and which is a continuation-in-part of U.S. application Ser. No. 09/844,272 filed Apr. 30, 2001, now U.S. Pat. No. 7,225,465 issued May 29, 2007, and which is a continuation-in-part of U.S. application Ser. No. 09/844,439 filed Apr. 30, 2001, now U.S. Pat. No. 7,363,486 issued Apr. 22, 2008.

1. FIELD OF INVENTION

The present invention relates to a data processing method and system for remote activation and management of Personal Security Devices (PSD) over a network for purposes of obtaining services or data from one or more Remote Computer Systems. More particularly, the invention relates to a secure single-step method of activating and managing a Personal Security Device.

2. BACKGROUND OF INVENTION

The current art involving the management of Personal Security Devices (PSD), for example, smart cards, requires a multi-step process where all the information necessary to use a PSD is loaded into this PSD prior to distribution, including an initial Personal Identification Number or PIN. The PSD is then sent to the end user followed by a separate letter containing the initial PIN which the user must enter the first time the PSD is used. Another current alternative affixes an adhesive label containing a telephone number on a PSD prior to issuance. This label provides instructions for the end user to telephone a call center to activate the PSD before the device can be used.

The latter and former methods constitute multi-step processes, which adds considerably to the initial distribution and subsequent management costs of the PSDs. For example, in issuing smart cards, additional equipment, maintenance, labor and operating costs are required to generate either the separate mailings containing an initial PIN, or to generate adhesive labels to be placed on the smart cards and to operate the call centers which activate the cards.

Another major drawback of the current art concerns the lack of ability to manage information contained within the PSD after the device is issued. Currently, PSDs, which require changes, are either sent back to a central location or simply discarded and replaced with a new device. Both processes are time consuming and costly.

3. SUMMARY OF INVENTION

It is an object of the present invention to provides a post-issuance method for securely downloading and managing information inside the protected domain of a PSD.

This object is achieved with a method for activating and/or managing at least one PSD with at least a first Remote Computer System over a first network using at least one Client as a host to said at least one PSD, said method comprising the steps of:

a) establishing at least one communications pipe over said first network between said at least one PSD and said at least first Remote Computer System,
b) retrieving proprietary information by said at least first Remote Computer System from a remote storage location,
c) transmitting said proprietary information from said at least first Remote Computer System to said at least one PSD through said at least one communications pipe, and
d) storing and/or processing said proprietary information in said at least one PSD.

This improvement over the current art utilizes a communications pipe which allows downloading of information into a blank PSD and subsequently managing that information. For purposes of this invention, a blank PSD lacks proprietary algorithms and/or data but does contain an embedded runtime environment and optionally a unique identifier code.

In a first embodiment of the method of the invention, said remote storage location is in said at least first Remote Computer System.

In a second embodiment of the method of the invention, said remote storage location is in an at least one subsequent Remote Computer System functionally connected to said at least first Remote Computer System over a second network, and said step b) comprises the step of transmitting said proprietary information from said at least one subsequent Remote Computer System to said at least first Remote Computer System through said second network.

These embodiments allow either the Remote Computer System maintaining the communications pipe (first embodiment) or a subsequent Remote Computer System (second embodiment) to download proprietary information such as authentication algorithms, cryptographic keys, credentials or certificates directly into a PSD connected to a local Client through the communications pipe without disclosing proprietary information to the local Client.

A major advantage of the method of the invention is that it allows blank PSDs to be issued in bulk and activated at a future date without risk of compromise. Since no proprietary data is included in a bulk distribution, the PSDs are not usable to gain access to secure functions or data.

An example process by which a blank PSD becomes activated is as follows; an end user, who has previously received a blank PSD, connects the PSD to a local Client and accesses a predetermined site over a network located on a Remote Computer System. The Remote Computer System may optionally perform end user authentication by some predetermined method such as prompting for a social security number, static PIN, mother's maiden name, etc. Alternatively, authentication may be implied using a unique identifier contained within the PSD.

Once the end user is properly authenticated or valid PSD connected, a Remote Computer System forms a communications pipe and downloads (first embodiment), or causes a subsequent Remote Computer System to download (second embodiment), the necessary information through the communications pipe and into the PSD. The PSD may become activated upon completion of the process or as an additional security measure, the end user is prompted to devise and enter a unique PIN code to further protect access to the PSD.

In both said embodiments of the invention, a means to manage (e.g. upgrade, change, delete) PSD algorithms and data is facilitated by remotely gaining access to the PSDs and then downloading the changes directly into the PSDs, again without leaving proprietary information on the Clients. Any changes necessary to proprietary information may be performed entirely within the secure domain of the PSD.

In both said embodiments of the invention, all transactions occur within the secure domain of a PSD and a secure remote computer system, thus providing end-to-end security.

In said second embodiment of the invention, a centralized depository for tracking of PSD changes is provided, which greatly simplifies the management of large numbers of PSDs.

It is another object of the invention to provide a system for implementing the above-mentioned method.

4. BRIEF DESCRIPTION OF DRAWINGS

Figure 2:
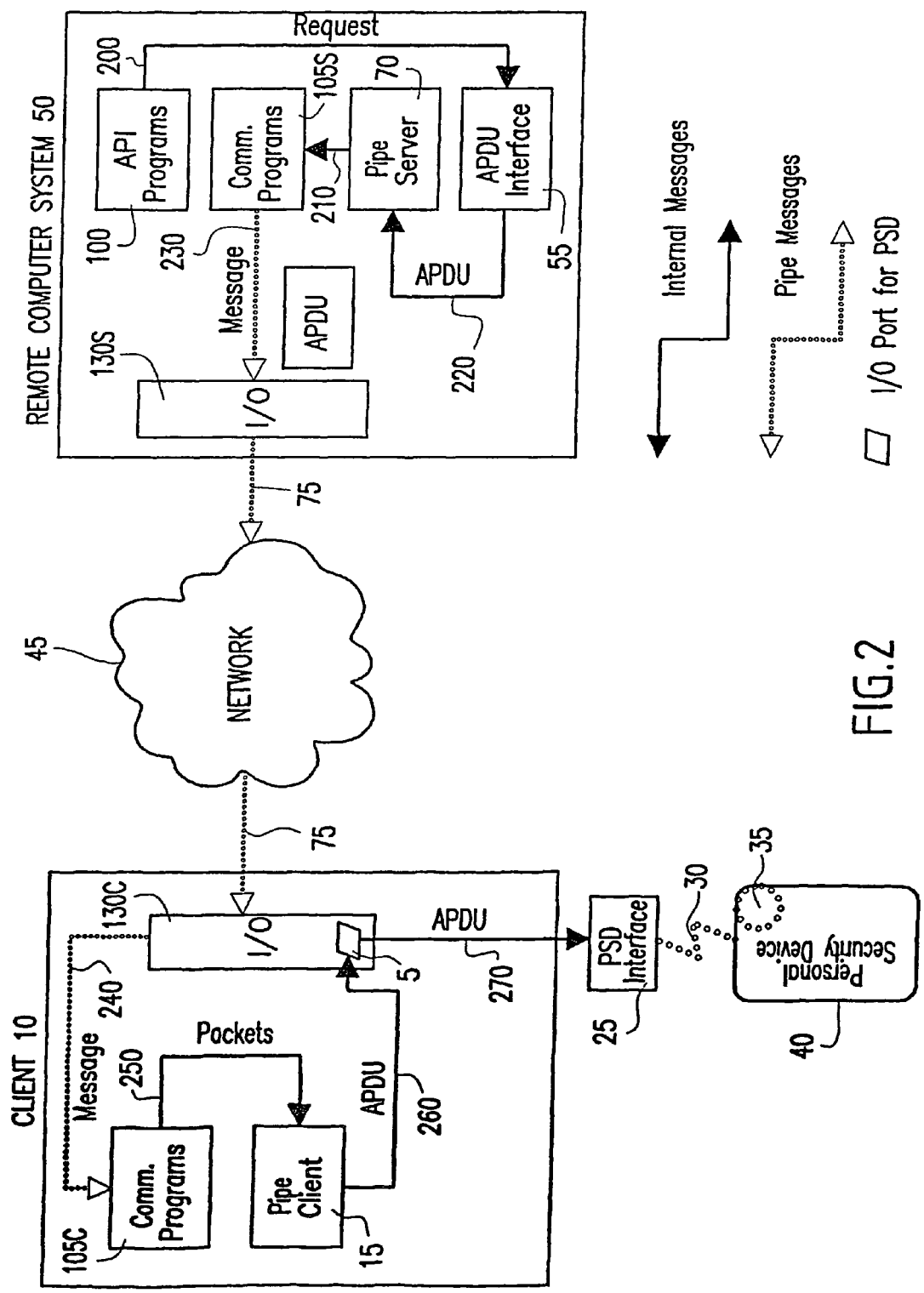
Figure 3:
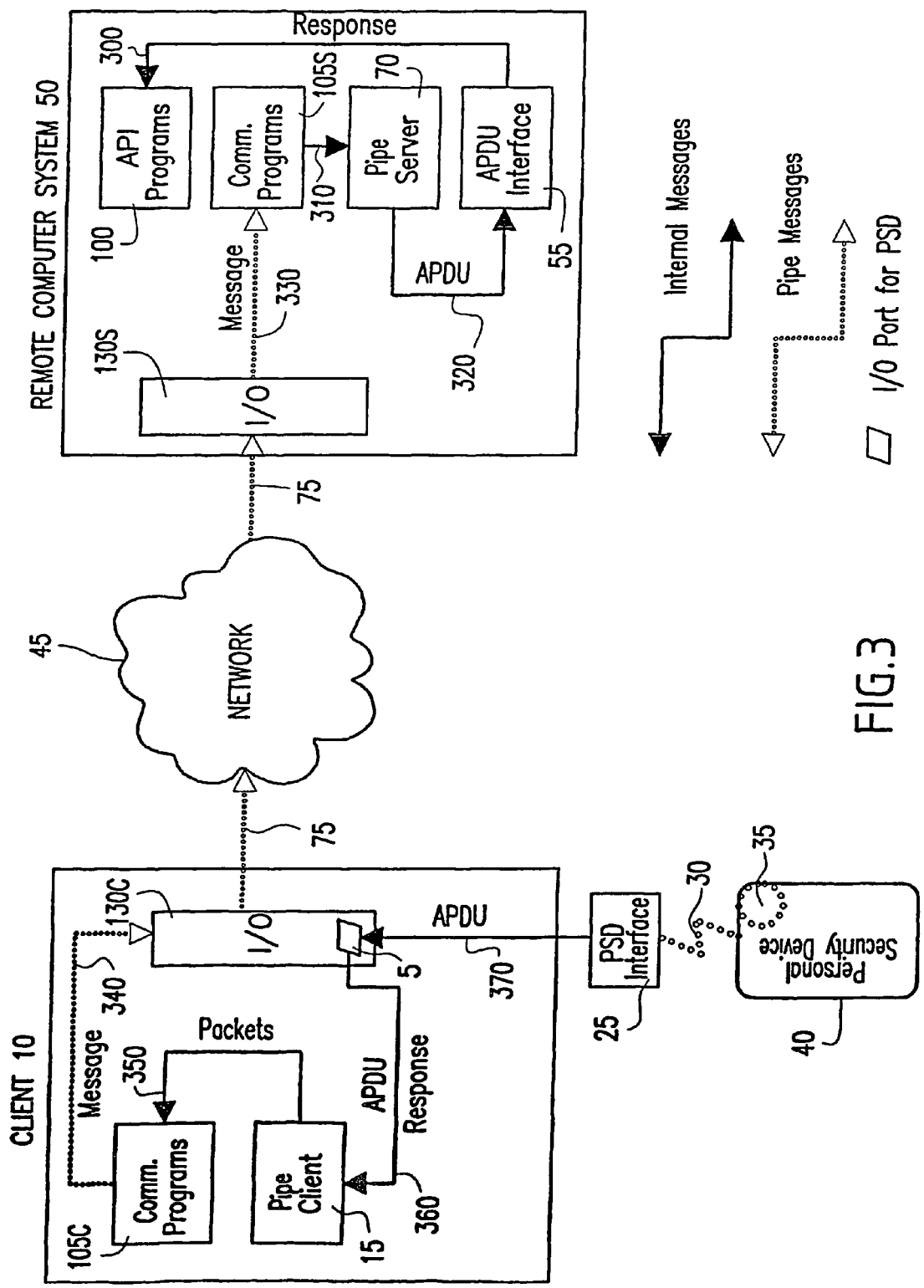
Figure 4A:
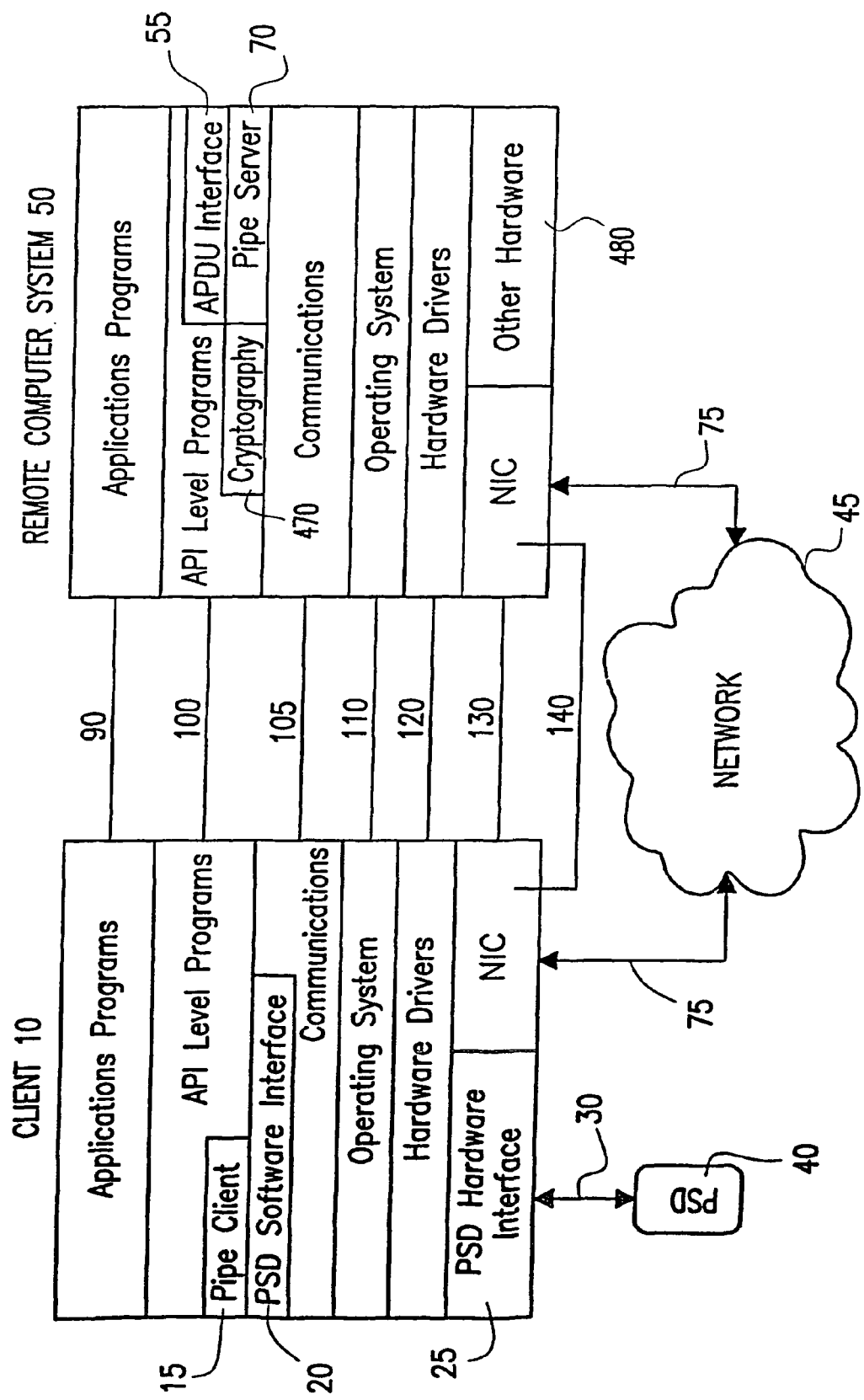
Figure 4B:
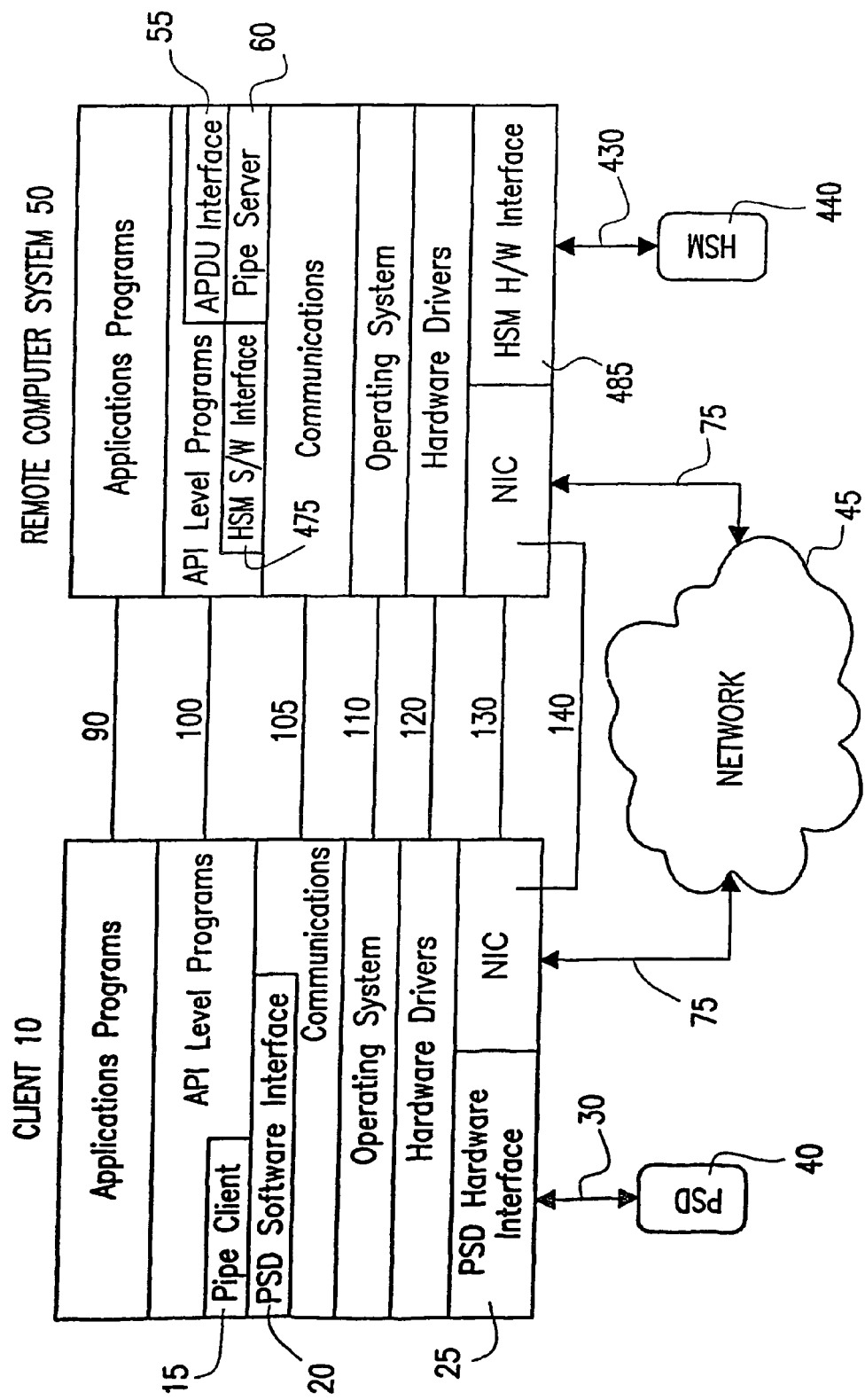
Figure 5:
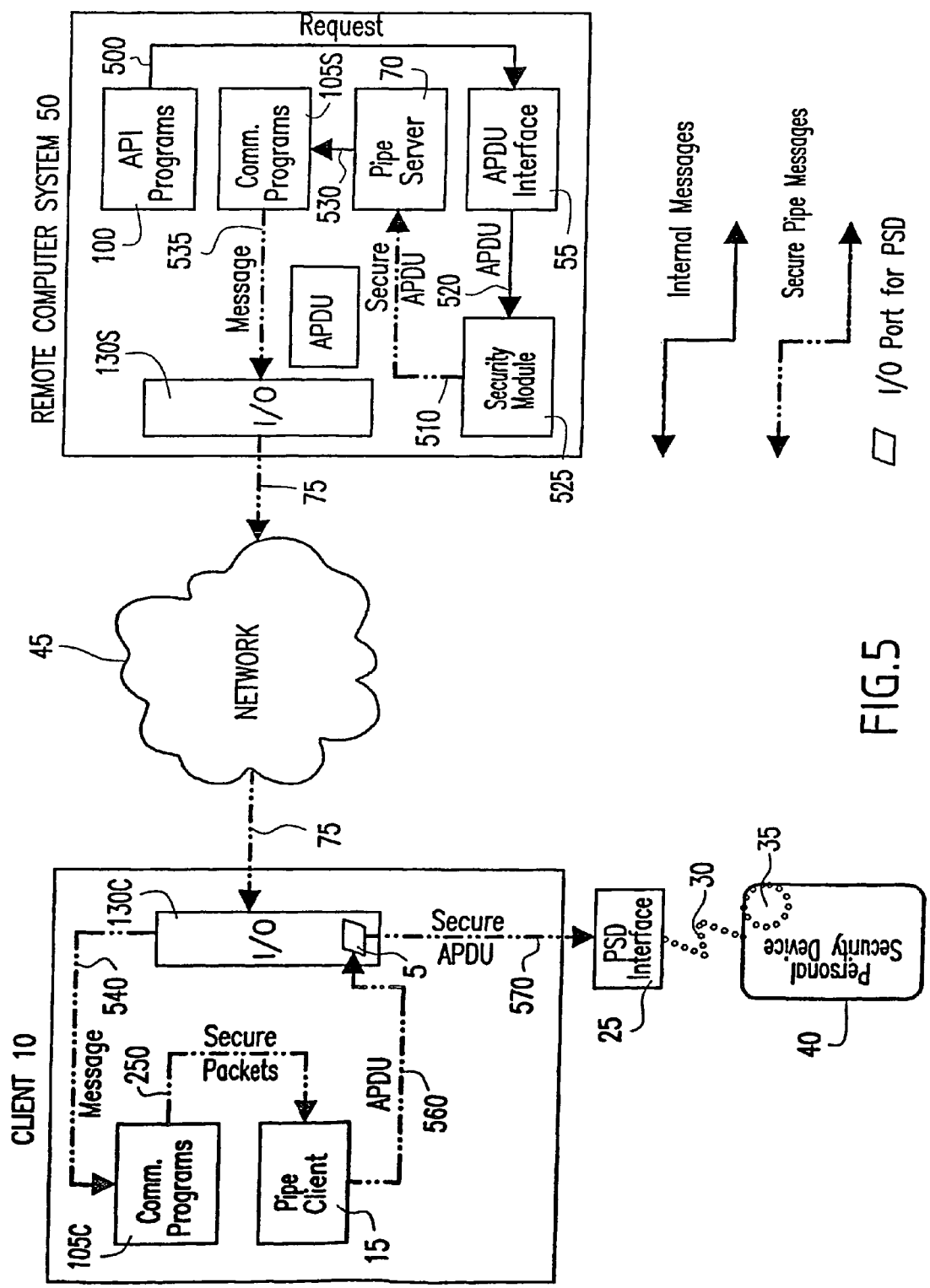
Figure 6:
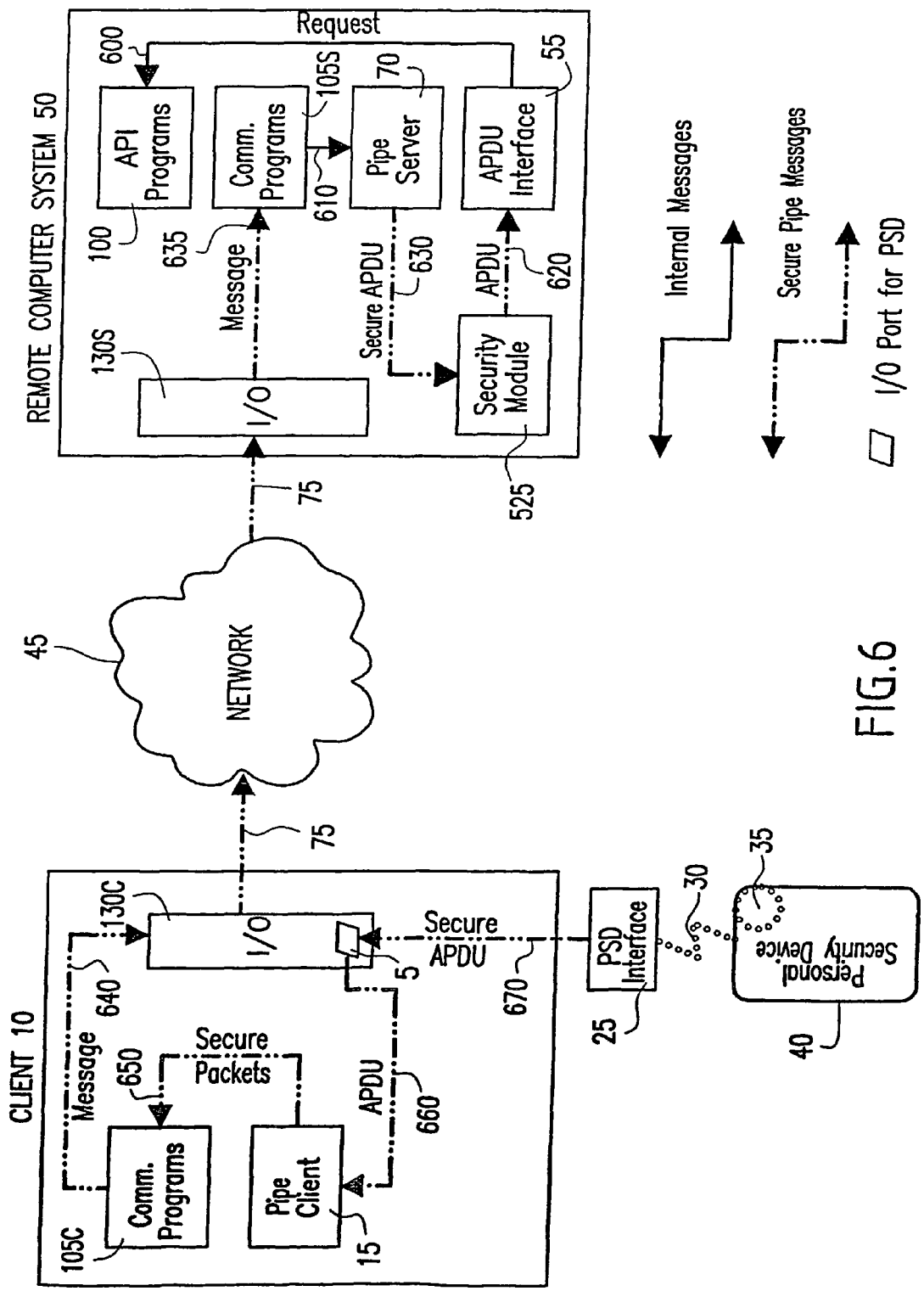
Figure 7:
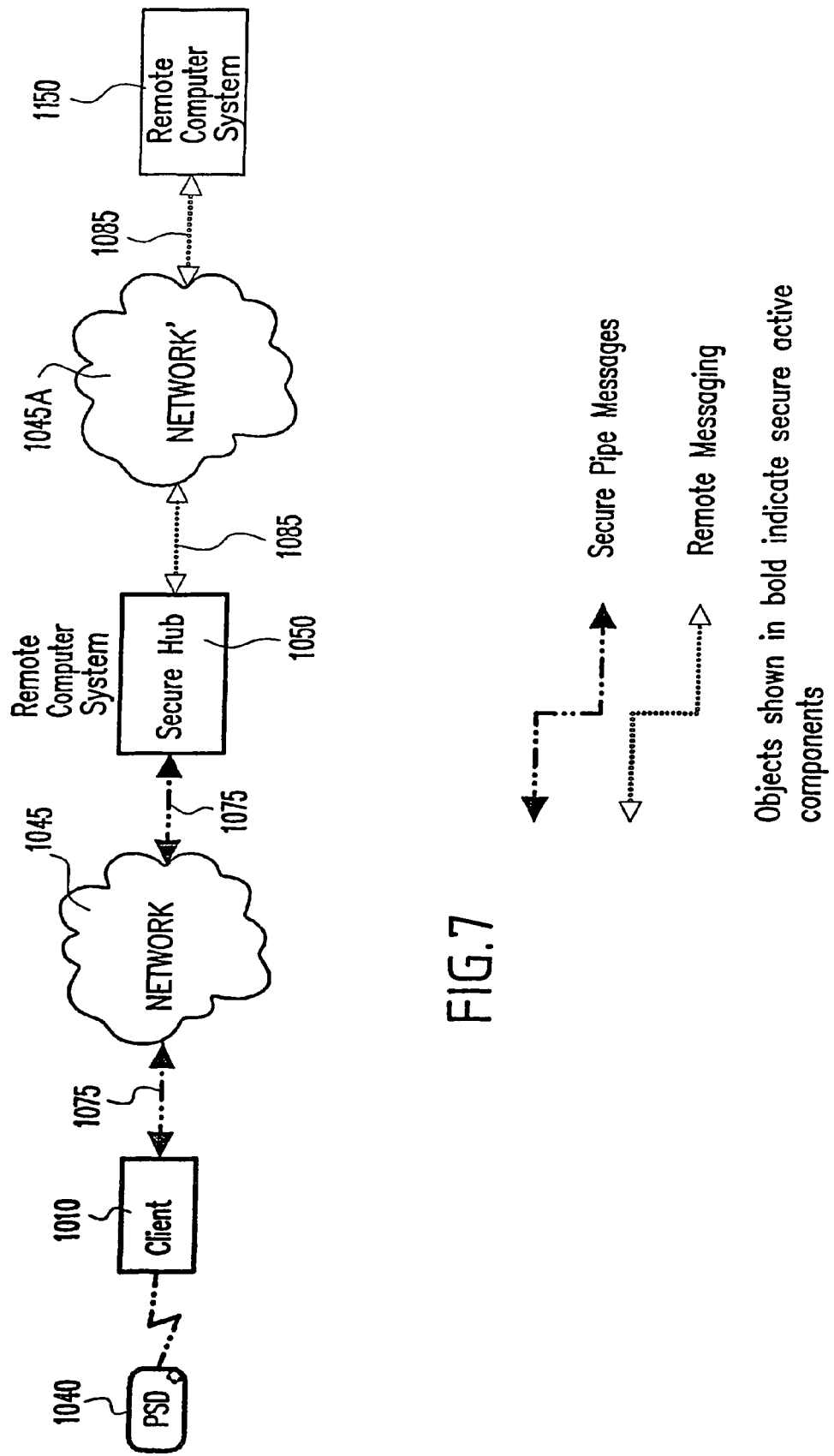
Figure 8:
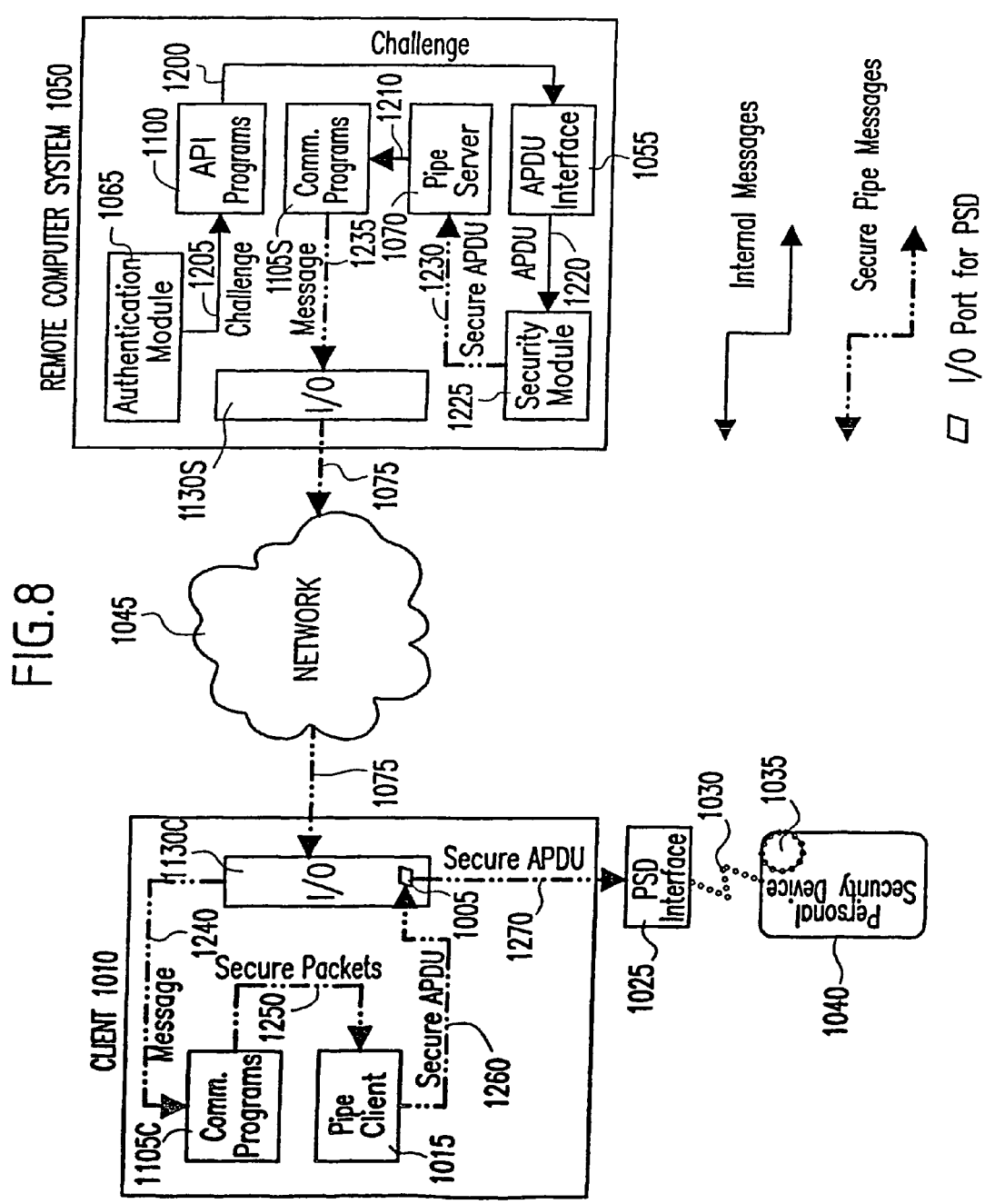
Figure 9:
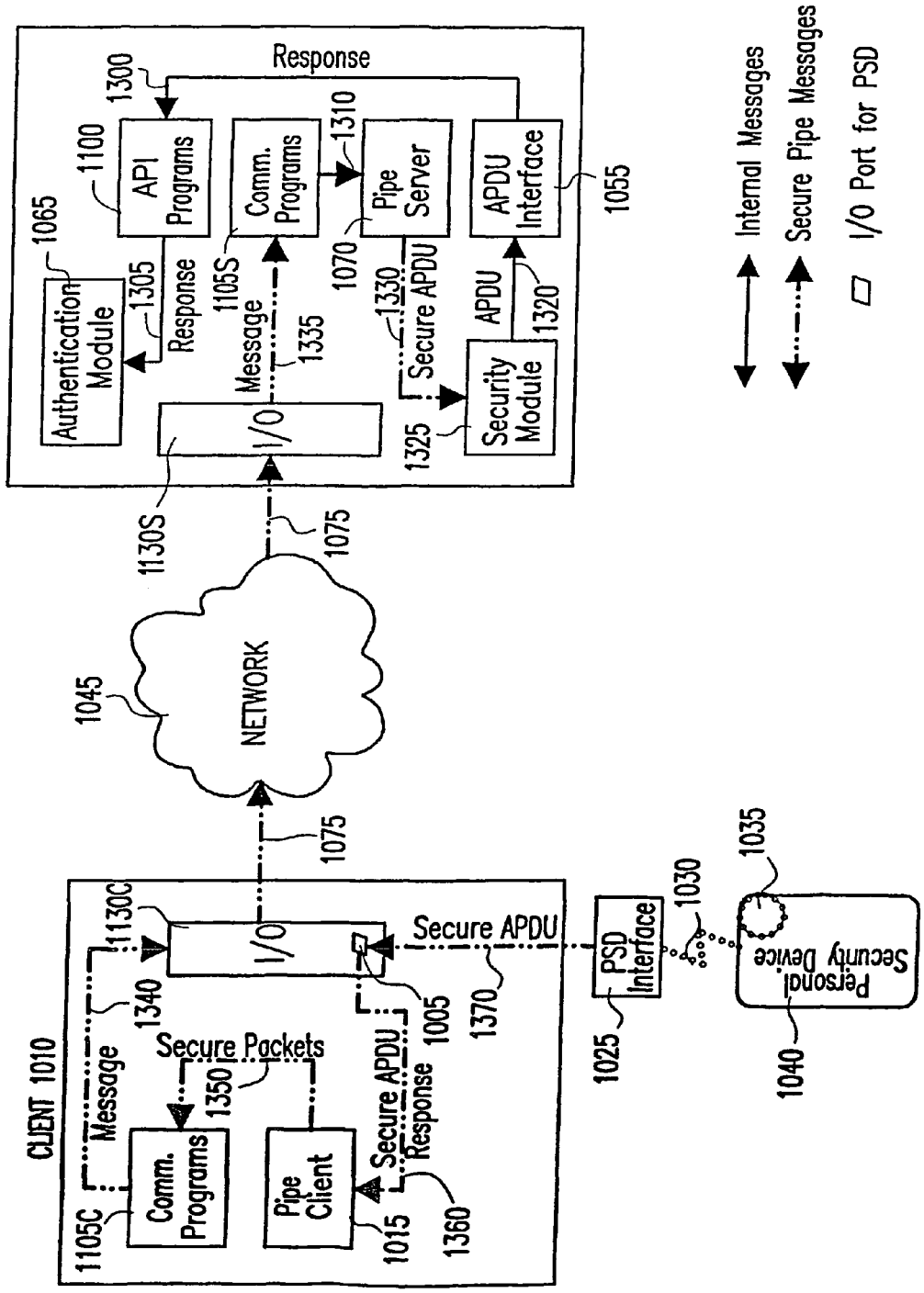
Figure 10:
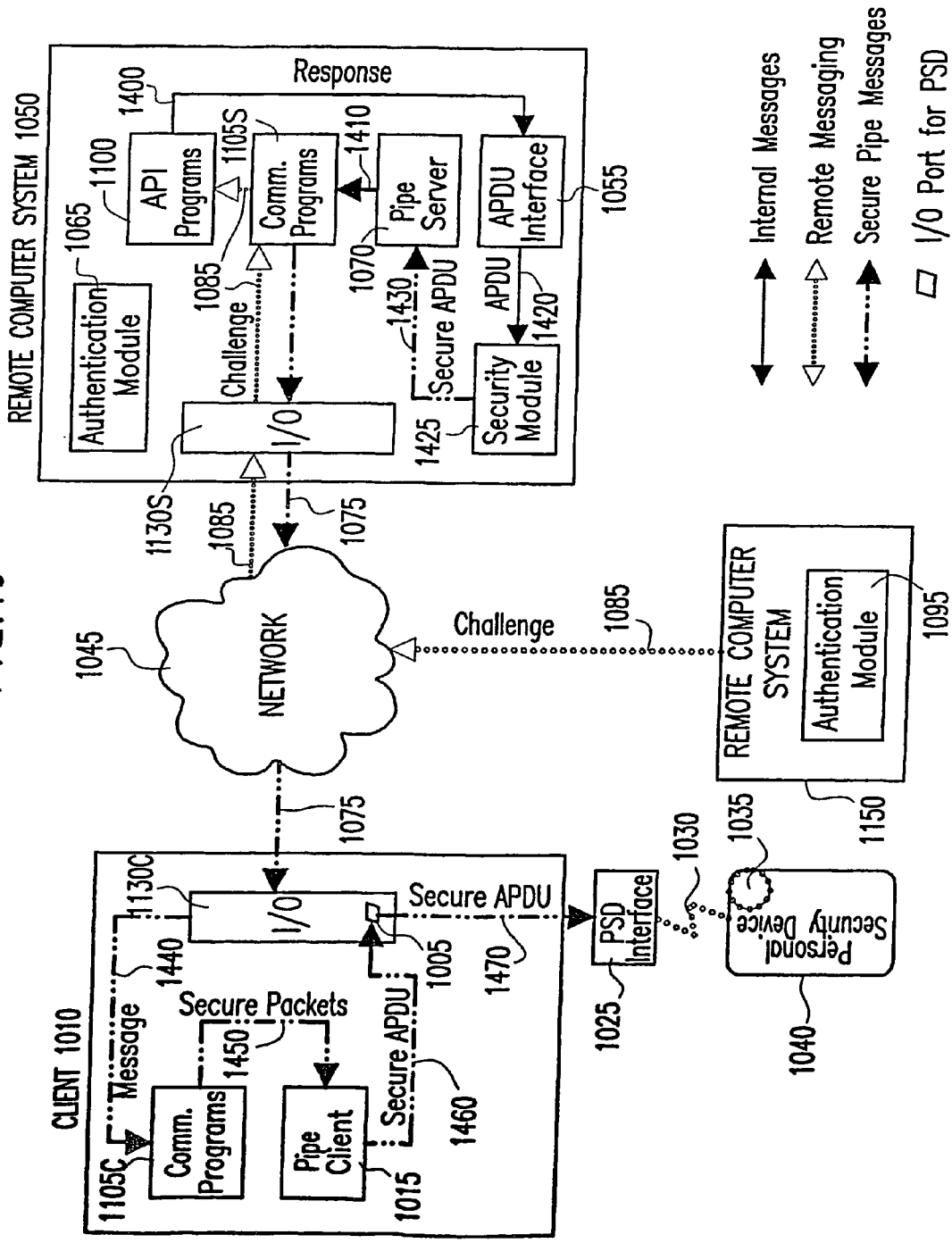
Figure 11:
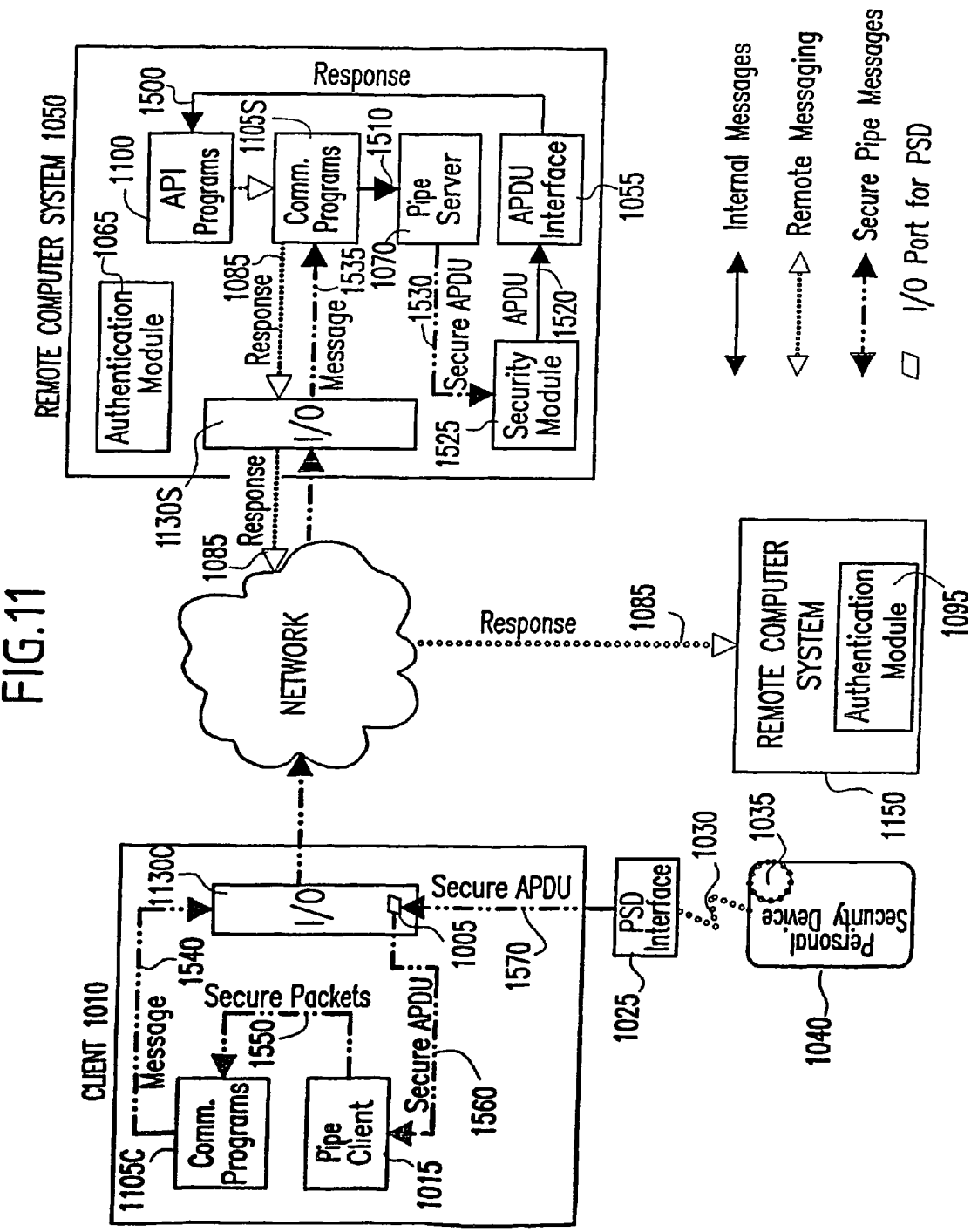
Figure 12:
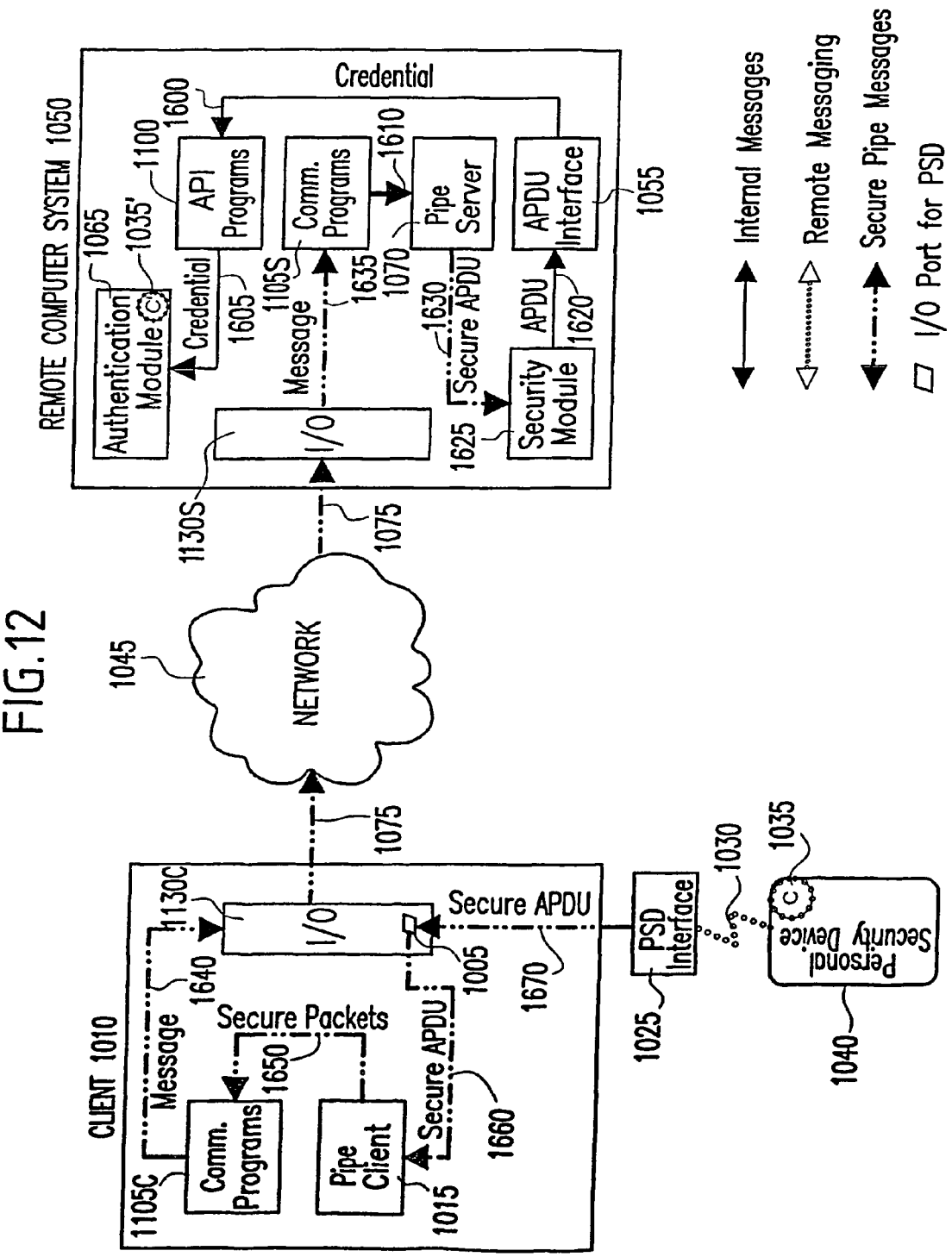
Figure 13:
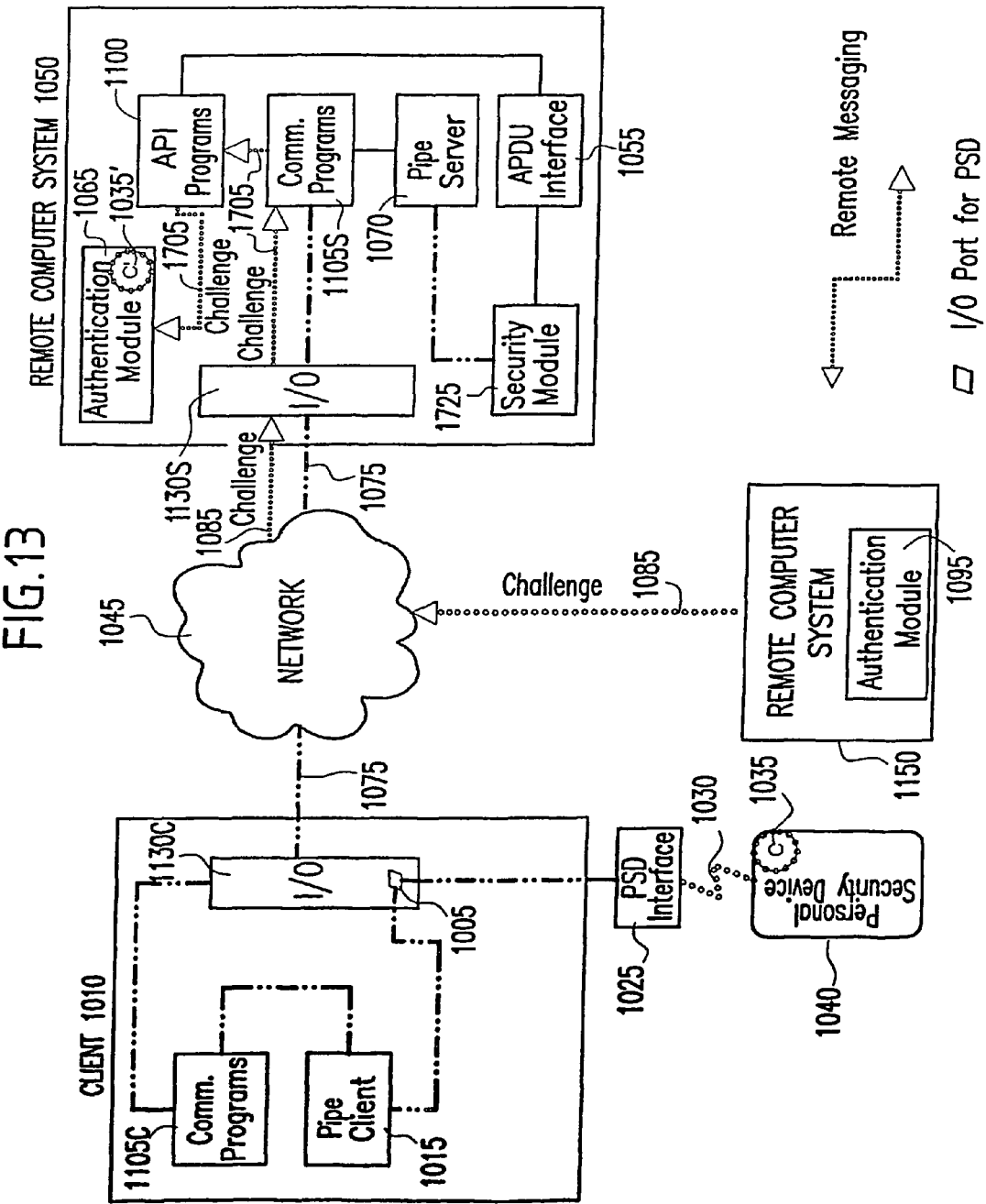
Figure 14:
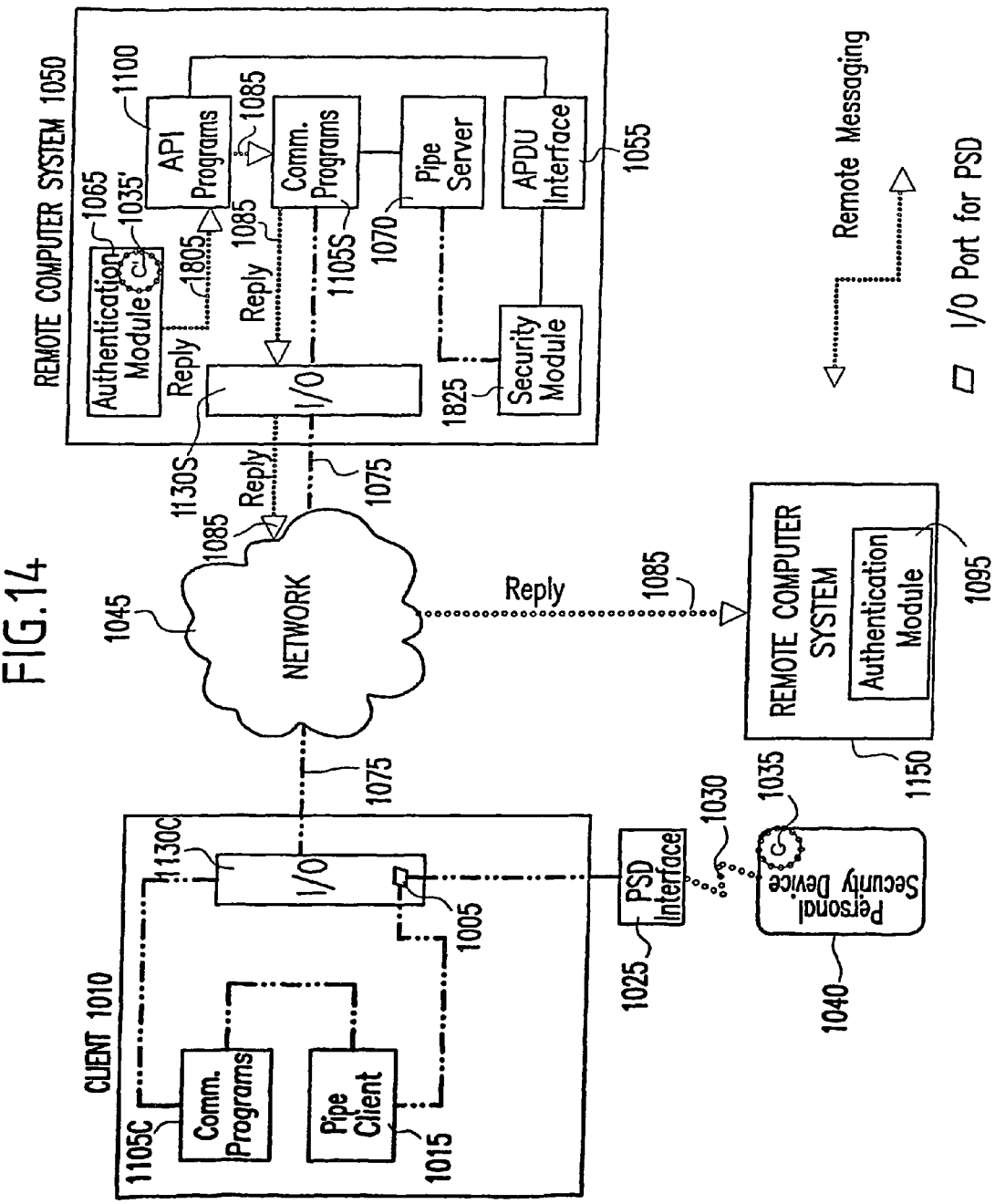
Figure 15B:
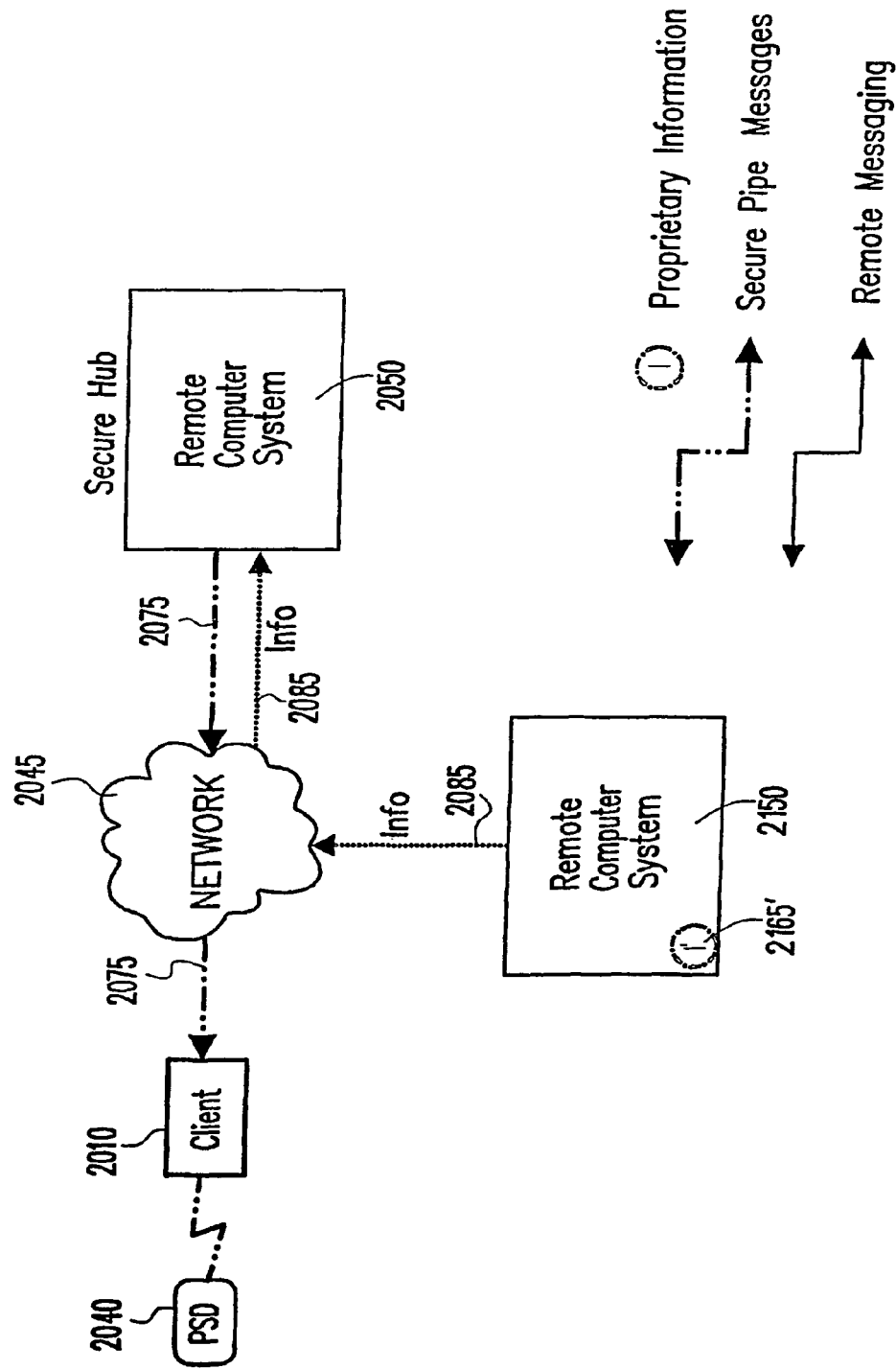
Figure 16:
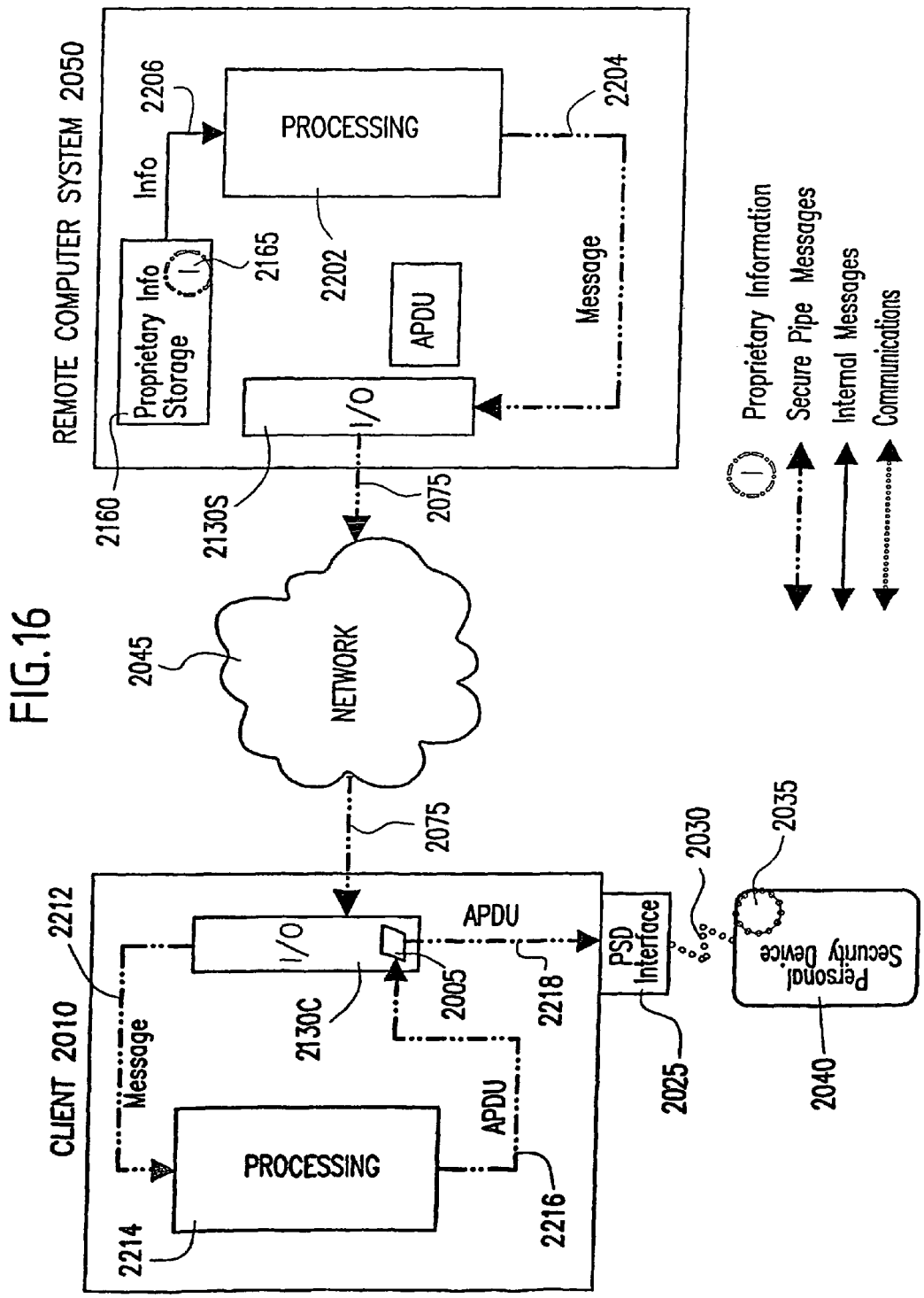
Figure 17:
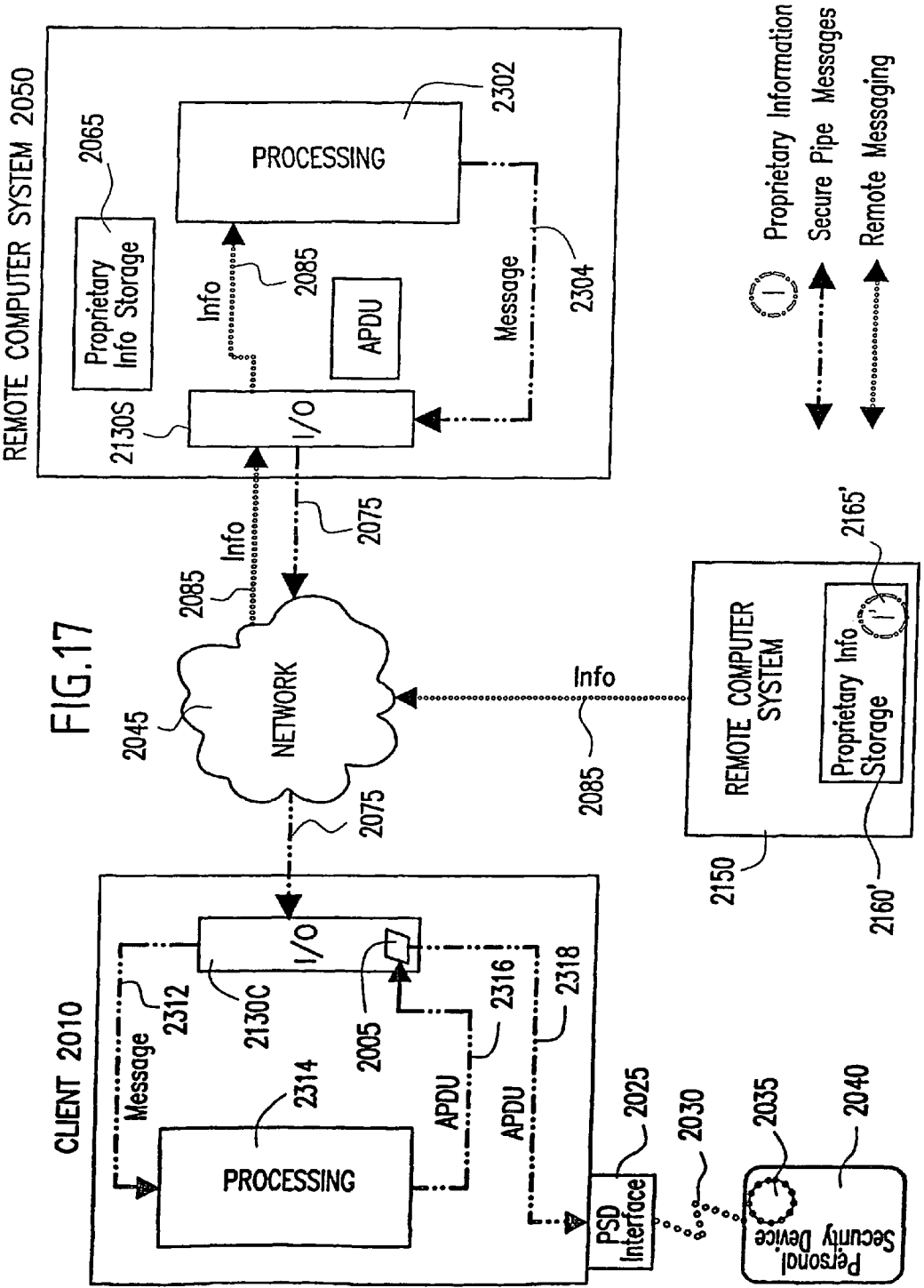

FIG. 1 is a generalized system block diagram for implementing a plain communications pipe, FIG. 2 is a detailed block diagram depicting initiating a plain communications pipe, FIG. 3 is a detailed block diagram depicting establishing a plain communications pipe, FIG. 4A is a generalized system block diagram for implementing a secure communications pipe which includes software-based security mechanisms, FIG. 4B is a generalized system block diagram for implementing a secure communications pipe which includes HSM-based security mechanisms, FIG. 5 is a detailed block diagram depicting initiating a secure communications pipe, FIG. 6 is a detailed block diagram depicting establishing a secure communications pipe, FIG. 7 is a general system block diagram for implementing the authentication of a PSD vis-à-vis at least one Remote Computer System, FIG. 8 is a detailed block diagram illustrating initial authentication challenge, FIG. 9 is a detailed block diagram illustrating initial authentication response, FIG. 10 is a detailed block diagram illustrating remote authentication challenge, FIG. 11 is a detailed block diagram illustrating remote authentication response, FIG. 12 is a detailed block diagram illustrating authentication credential transfer, FIG. 13 is a detailed block diagram illustrating remote authentication challenge using said transferred credential, FIG. 14 is a detailed block diagram illustrating remote authentication response using said transferred credential, FIG. 15A is a general system block diagram for implementing present invention using a first Remote Computer System (first embodiment of the invention), FIG. 15B is a general system block diagram for implementing present invention using a subsequent Remote Computer System (second embodiment of the invention), FIG. 16 is a detailed block diagram illustrating the direct transfer of proprietary information to a PSD (first embodiment of the invention), FIG. 17 is a detailed block diagram illustrating the remote transfer of proprietary information to a PSD (second embodiment of the invention).

5. DETAILED DESCRIPTION OF THE INVENTION

In a first part (section 5.1.), the present Detailed Description of the Invention will disclose how to establish a plain communications pipe and a secure communications pipe between a PSD and a Remote Computer System.

In a second part (section 5.2.), the present Detailed Description of the Invention will disclose how to enhance security of an authentication process of a PSD vis-à-vis a Remote Computer System using said secure communications pipe, and how to use said Remote Computer System as a secure hub for authentication of said PSD vis-à-vis a plurality of subsequent Remote Computer Systems.

In a third part (section 5.3.), the present Detailed Description of the Invention will disclose a post-issuance method and system for securely downloading and managing information inside the protected domain of a PSD.

Said second part of the Detailed Description will be based on the use of a secure communications pipe, but the present invention is not limited to such a use.

The use of a plain communications pipe, i.e. of a communications pipe which does not involve end-to-end cryptographic mechanisms, falls within the scope of the present invention.

Note also that the following description of the invention will be based on a PSD which receives and sends APDU—(Application Protocol Data Unit)—formatted messages.

APDU messaging format, which is per se known in the art, is a lower-level messaging format which allows a PSD to communicate with higher-level applications located in devices to which the PSD is to be connected.

It must be clear that the present invention is not limited to the use of an APDU messaging format, and that any other low-level messaging format that can be processed by the PSD enters within the scope of the present invention.

5.1. Establishment of a Communications Pipe

5.1.1. Plain Communications Pipe

Referring to FIG. 1, a generalized system block diagram of the architectures of a Client 10 and of a Remote Computer System is depicted. The various layers shown are based on the Open System Interconnection model (OSI). For simplicity, certain layers common to both the Client and Remote Computer System are not shown and should be assumed to be present and incorporated into adjacent layers. The layers common to both a Client and Remote Computer System include:

- an Applications Layer 90 which generally contains higher level software applications (e.g. word processor) and a user interface and such as a Graphical User Interface (GUI),
- an Applications Programming Interface (API) Layer 100 for processing and manipulating data for use by either higher or lower level applications,
- a Communications Layer 105 which contains communications programs including secure communications capabilities, which enable a Client to communicate with a Remote Computer System to exchange information in an agreed upon protocol and visa versa,
- an Operating System Layer 110 or equivalent runtime environment, which controls the allocation and usage of hardware resources such as memory, Central Processing Unit (CPU) time, disk space, hardware I/O port assignments, peripheral device management,
- a Hardware Drivers Layer 120 which permits the operating system to communicate and control physical devices connected to the Client's or Remote Computer System's hardware I/O bus,
- and a Physical Device Layer 130 where Network Interface Cards (NIC) 140 provide the physical connections to a telecommunications network 45. Other Hardware Devices 80 may also be connected at this Layer.

5.1.1.1. Client Specific Features

A specialized program contained within the API Layer 100 of the Client and referred to as a Pipe Client 15, interacts with Communications Programs contained within the Communications Layer 105. The Pipe Client 15 functions to separate encapsulated APDU requests from incoming messaging packets received from a network 45 for processing by a locally connected PSD 40. Alternately, outbound APDU responses generated by a locally connected PSD 40, are processed by the Pipe Client for encapsulation into an agreed upon communications protocol by Communications Programs contained within the Communications Layer 105.

A software driver contained within the Communications Layer 105 of the Client and referred to as a PSD Software Interface 20 directs incoming APDUs communicated by the Pipe Client 15 into the I/O device port connecting the PSD Hardware Device Interface 25 to the locally connected PSD 40. Outgoing APDUs generated by the PSD are communicated through the PSD Hardware Device Interface 25 through the I/O device port to the PSD Software Interface 20 and subsequently communicated to the Pipe Client 15.

5.1.1.2. Remote Computer System Specific Features

A first specialized program contained within the API Layer 100 of the Remote Computer System 50 and referred to as an APDU Interface 55, translates higher level messaging formats into low-level APDU messaging format required to communicate with a PSD 40. Alternately, the APDU Interface 55 translates incoming APDU responses received from a PSD 40 into higher level messaging formats used by programs in the API Layer 100 and Applications Layer 90 of the Remote Computer System.

A second specialized program contained within the API Layer 100 of the Remote Computer System 50 and referred to as a Pipe Server 70 interacts with Communications Programs contained within the Communications Layer 105. The Pipe Server 70 functions to separate encapsulated APDU requests from incoming messaging packets received from a network 45 for processing by the APDU Interface 55. Alternately, outbound APDU requests translated by the APDU Interface 55 are processed by the Pipe Server for encapsulation into an agreed upon communications protocol by Communications Programs contained within the Communications Layer 105.

5.1.1.3. Other Features

The connection 30 between the PSD 40 and PSD Hardware Interface 25 includes but is not limited to traditional electrical or optical fiber connections or wireless means including optical, radio, acoustical, magnetic, or electromechanical. Likewise the connection 75 between the Client 10 and the network 45, and the connection 75 between the Remote Computer System 50 and the network 45 may be accomplished analogously.

The network, shown generally at 45, includes both public and private telecommunications networks connected by traditional electrical, optical, electro-acoustical (DTMF) or by other wireless means. Any mutually agreed upon communications protocol capable of encapsulating APDU commands may be employed to establish a plain communications pipe including open or secure communications protocols.

Referring now to FIG. 2, depicts initiating a plain communications pipe between the Remote Computer System 50 and the PSD 40 connected to a Client 10. In this depiction, the Remote Computer System 50 is sending a request to PSD 40 for non-proprietary embedded information 35, for example an identification number. PSD 40 is connected 30 to the local Client 10 using PSD Interface 25. PSD Interface 25 communicates with the Client 10 via hardware device port 5.

To initiate a plain communications pipe between Remote Computer System 50 and PSD 40, the Remote Computer System 50 generates a request 200 by way of API programs 100 which is translated into APDU format 220 by the APDU Interface 55 and sent to the Pipe Server 70 for message encapsulation. The encapsulated APDUs are then sent 210 to the Communications Programs 105S for incorporation into outgoing message packets 230.

The message packets 230 containing the encapsulated APDUs are transmitted 75 over the network 45 via a Network Interface Card (I/O) 130S. The Client 10 receives the message packets 240 containing the encapsulated APDUs which are received from the network 45 via a Network Interface Card (I/O) 130C installed on the local Client. The incoming messages are processed by Client-side Communications Programs 105C and routed 250 into the Pipe Client 15 for APDU extraction. The extracted APDUs are sent 260 through hardware device port 5, routed 270 into the PSD Interface 25 and sent to PSD 40 via connection 30 for processing within PSD domain 35.

Alternative requests to form a plain communications pipe 75 between a Remote Computer System 50 and a PSD 40 may be initiated by Client 10 requesting access to information contained on one or more networked local Clients, by connecting a PSD 40 to PSD Interface 25 which initiates a request to form a plain communications pipe 75, or by another Remote Computer System requesting access to PSD 40.

Referring now to FIG. 3, depicts a PSD response which establishes the plain communications pipe between PSD 40 and Remote Computer System 50. In this depiction, the request previously received is processed within the PSD domain 35, which generates a response message. The PSD response is sent in APDU format from PSD 40 through connection 30 and into PSD interface 25. The PSD response is then routed 370 through hardware device port 5 and sent 360 to the Pipe Client 15 for processing and encapsulation. The resulting message packets are then sent 350 to the Client-side Communications Programs 105C for incorporation into outgoing message packets 340. The message packets 340 containing the encapsulated APDUs are transmitted 75 over the network 45 via the Network Interface Card (I/O) 130C.

The Remote Computer System 50 receives the message packets 330 containing the encapsulated APDUs, which are received from the network 45 via the Network Interface Card (I/O) 130S installed on the Remote Computer System. The incoming messages are processed by server-side Communications Programs 105S and routed 310 into the Pipe Server 70 for APDU extraction. The extracted APDUs are sent 320 to the APDU Interface 55 for processing and translation into a higher-level format and sent 300 to API Level programs 100 for processing and further transactions with the PSD 40 if desired.

5.1.2. Secure Communications Pipe

Referring now to FIG. 4A, a generalized system block diagram of one implementation of a secure communications pipe is shown. The general system block diagram includes an additional software-based Cryptography Module 470 installed on the Remote Computer System, which is not shown in FIG. 1.

FIG. 4B depicts an alternative to using software-based security mechanisms. In this alternative, a Hardware Security Module (HSM) 440 is employed to perform cryptographic functions. To access the HSM, a software driver referred to as an HSM S/W Interface 475, is included in the API Layer 100. The HSM software driver communicates with a physical device interface included in the Physical Device Layer 130. The physical device interface is installed on the I/O bus of the Remote Computer System, and is referred to as an HSM H/W Interface 485. The HSM module 440 is connected 430 to the HSM H/W Interface in a manner analogous to the PSD connection to the PSD Interface previously described. The use of HSM technologies provides end-to-end security, which further reduces the possibility of unauthorized disclosure of cryptographic or sensitive information.

Both APDU messaging security mechanisms shown in FIGS. 4A & 4B are used to generate cryptographic keys necessary to unlock secure functions and data contained within the secure domain of a PSD, encrypt outgoing APDUs and decrypt incoming encrypted APDUs. The security mechanisms employed in generating a secure pipe may include synchronous, asynchronous or any combination of cryptography methods.

Secure communications protocols used to communicate over a network are accomplished by the Communications Programs contained within the Communications Layers 105. Cryptography used in generating secure communications may employ the security mechanisms described for APDU messaging, employ separate mechanisms or employ any combination thereof.

Referring now to FIG. 5, depicts the initiating of a secure pipe between the Remote Computer System and the PSD 40 connected to Client 10. In this depiction, Remote Computer System 50 is sending a secure request to PSD 40 for proprietary embedded information 35, for example an authentication password. PSD 40 is connected 30 to the local Client 10 using PSD Interface 25. PSD Interface 25 communicates with the Client 10 via hardware device port 5.

To initiate a secure communications pipe between Remote Computer System 50 and PSD 40, a request 500 is generated on Remote Computer System 50 to access PSD 40 by way of API programs 100 which are translated into APDU format by the APDU Interface 55. The APDUs are then sent 520 to a Security Module 525 for encryption using a pre-established cryptography method. The proper cryptographic parameters may be determined by using a look-up table or database, which cross-references the PSD's unique internal identification information with one or more codes necessary to implement the appointed cryptography method.

The encrypted APDUs are then routed 510 to the Pipe Server 70 for message encapsulation. The encapsulated APDUs are then sent 530 to the Communications Programs 105 for processing, encryption using a pre-established secure communications protocol and incorporation into outgoing message packets 535. The secure message packets 535 containing the encrypted and encapsulated APDUs are transmitted 75 over the network 45 via a Network Interface Card (110) 130S.

The Client 10 receives the message packets 540 containing the encrypted and encapsulated APDUs which are received from the network 45 via a Network Interface Card (I/O) 130C installed on the local Client 10.

The incoming encrypted message packets are decrypted and processed using the pre-established cryptography employed in the secure communications protocol by Client-side Communications Programs 105C. The unencrypted message packets still containing the encrypted APDUs are routed 550 into the Pipe Client 15 for APDU extraction. The extracted APDUs are sent 560 through hardware device port 5, routed 570 into the PSD Interface 25 and sent to PSD 40 via connection 30 for decryption and processing within the secure domain 35 of the PSD 40. Using a pre-established cryptography method, incoming secure APDUs are decrypted and requests processed.

Referring now to FIG. 6, depicts a PSD secure response, which establishes the secure communications pipe between PSD 40 and Remote Computer System 50. In this depiction, the secure request previously received is processed within the secure domain 35 of the PSD 40, which causes the PSD to generate a secure response message using a pre-established cryptography method.

The PSD secure response is sent in APDU format from PSD 40 through connection 30 and into PSD interface 25. The PSD secure response is then routed 670 through hardware device port 5 and sent 660 to the Pipe Client 15 for processing and encapsulation. The resulting message packets are then sent 650 to the Client-side Communications Programs 105 for processing, encryption using a pre-established secure communications protocol and incorporation into outgoing message packets 640. The message packets 640 containing the encapsulated APDUs are transmitted 75 over the network 45 via the Network Interface Card (I/O) 130C.

The Remote Computer System 50 receives the message packets 635 containing the encapsulated APDUs from the network 45 via the Network Interface Card (I/O) 130S installed on the Remote Computer System 50. The incoming messages are processed and decrypted using the pre-established cryptography method employed in the secure communications protocol by the server-side Communications Programs 105 and routed 610 into the Pipe Server 70 for secure APDU extraction. The extracted secure APDUs are sent 630 to the Security Module 525 for decryption of the secure APDUs using the pre-established cryptography method. The decrypted APDUs are then routed 620 to the APDU Interface 55 for processing and translation into a higher-level format and, sent 600 to API programs 100 for processing and further transactions with the PSD 40 if desired. This step establishes the secure "pipe" to communicate with the PSD. The secure pipe is maintained until the Remote Computer System signals the Client to close the hardware interface port 5.

No limitation is intended in the number of PSDs and Clients forming communications pipes 75 with one or more Remote Computer System(s) 50, nor should any limitation on the number of Remote Computer Systems 50 available for generating communications pipes 75 be construed from the drawings. Lastly, no limitation is intended concerning the initiating event to establish a communications pipe.

5.2. Authentication Method Using a Communications Pipe

As already mentioned above, description of said authentication method will be based on the use of a secure communications pipe, but the present invention is not limited to such a use.

The use of a plain communications pipe falls within the scope of the present invention.

The steps involved in performing authentication through a secure communications pipe are shown in FIGS. 7 through 14. FIG. 7 is a generalized system block diagram. FIGS. 8 through 11 illustrate a first variant where responses to authentication challenges are generated within the secure domain of a Personal Security Device. FIGS. 12 through 14 illustrate a second variant where a Remote Computer System acting as a secure hub provides the proper response to authentication challenges, rather than directing challenges through the communications pipe into the PSD for processing. Characters shown with a prime sign (e.g. C') indicate a duplicate of an original authentication credential. Other drawing details shown but not described refer to information described in previous section 5.1.

Referring now to FIG. 7, a generalized system block diagram is depicted, where a Personal Security Device 1040 is connected to a Client 1010 which is itself connected over a network 1045 to a Remote Computer System 1050 using a secure communications pipe 1075 as described in previous section 5.1.2. Remote Computer System 1050 is operating as a secure hub following initial authentication as described below, to service authentication requests made by subsequent Remote Computer Systems sent over a network 1045 or 1045A.

The subsequent Remote Computer System 1150 is an example of a system requiring authentication when a request for secure functions or data is sent from Client computer 1010 over the networks 1045 and 1045A. The secure communications pipe 1075 applies to authentication transactions but does not restrict nor control non-secure transactions occurring over either network 1045 or 1045A.

Networks 1045 and 1045A may be a common network as in a virtual private networking arrangement or separate networks such as private intranet and public internet arrangements. The networks 1045 and 1045A are depicted separately for illustrative purposes only. No limitation is intended in the number of PSDs and Clients forming communications pipes 1075 with one or more secure hubs 1050; nor should any limitation on the number of subsequent Remote Computer Systems 1150 available for authentication be construed from the drawing. Transactions not involving authentications are not restricted to the secure hub.

The basic operation of the secure hub may be initiated when an end user at a Client requests access to secure functions or data contained on one or more Remote Computer Systems connected by a network. An available Remote Computer System, in which a secure communications pipe has been established as described in previous section 5.1.2., authenticates the end user and Client using the security mechanisms contained within the secure domain of the PSD. Alternatively, an external event such as a need to update information within a PSD may trigger a subsequent Remote Computer System to initiate the authentication process.

Once an initial Client authentication has been accomplished by the available Remote Computer System, subsequent authentication challenges transmitted over a network 1045 or 1045A made by subsequent Remote Computer Systems are directed to the Remote Computer System 1050 acting as a secure hub and depending on which variant employed, are either routed through the appropriate communications pipe 1075 to PSD 1040 or are directly authenticated by the Remote Computer System 1050.

5.2.1. First Variant of Authentication Method

Referring to FIG. 8, to establish a secure hub, a Client 1010 causes an authentication challenge to be generated on a Remote Computer System 1050, by requesting access to secure functions or data over a network 1045. Upon receiving the request from Client 1010, the Remote Computer System 1050 generates an authentication challenge 1205 within a secure domain designated as authentication routine 1065. The authentication challenge is processed by an API level program 1100 and routed 1200 to an APDU interface 1055 for translation into an APDU format. The APDUs are then sent 1220 to a Security Module 1225 for encryption. The encrypted APDUs are then routed 1230 to a Pipe Server 1070 for encapsulation into outgoing messaging and sent 1210 to the Communications Programs 1105S for transmission over the communications pipe 1075, through the network 1045 into the network interface 1130C of the Client 10. The incoming messages are then routed 1240 to Communications Programs 1105C for processing.

Following processing, the messages are sent 1250 to a Pipe Client 1015 for separation of the encapsulated APDUs. The APDUs are then sent 1260 through a hardware device port 1005 assigned to a PSD Interface 1025. PSD Interface 1025 routes the incoming APDUs into the PSD 1040 via connection 1030, where it is subsequently decrypted and processed within its secure domain 1035.

Referring to FIG. 9, once PSD 1040 has processed the authentication challenge within the secure domain 1035 of the PSD, an authentication response message is generated using a pre-established cryptography method.

The authentication response is sent in APDU format from PSD 1040 through connection 1030 and into PSD interface 1025. The PSD secure response is then routed 1370 through hardware device port 1005 and sent 1360 to the Pipe Client 1015 for processing and encapsulation. The resulting message packets are then sent 1350 to the Client-side Communications Programs 1105C for processing, encryption using a pre-established secure communications protocol and incorporation into outgoing message packets 1340. The message packets 1340 containing the encapsulated APDUs are transmitted 1075 over the network 1045 via a network interface card (I/O) 1130C.

The Remote Computer System 1050 receives the message packets 1335 containing the encapsulated APDUs from the network 1045 via a network interface card (I/O) 1130S installed on the Remote Computer System. The incoming messages are processed and decrypted using the pre-established cryptography method employed in the secure communications protocol by the server-side Communications Programs 1105S and routed 1310 into the Pipe Server 1070 for secure APDU extraction. The extracted secure APDUs are sent 1330 to the Security Module 1325 for decryption of the secure APDUs using the pre-established cryptography method. The decrypted APDUs are then routed to the APDU Interface 1055 for processing and translation into a higher-level format and sent 1300 to API Level programs 1100 for processing. If authentication is successful, the Remote Computer System 1050 allows access to secure functions or data and establishes itself as a secure hub. If authentication fails, the end user will be unable to access secure functions or data.

Referring to FIG. 10, once the secure hub has been established as previously described, remote authentication of subsequent Remote Computer Systems may be accomplished. Remote authentication may be initiated either by a Client's request for access to secure functions or data or by other Remote Computer Systems to perform transactions within the secure domain of a PSD.

To perform a remote authentication, a challenge 1085 is issued by a subsequent Remote Computer System 1150. The challenge is routed over a network 1045, into the secure hub 1050. The incoming challenge is processed and decrypted in the secure hub 1050 using the pre-established cryptography method employed in the secure communications protocol by the server-side Communications Programs 1105S and routed 1085 to an API level program 1100 where it is processed and routed 1400 to an APDU interface 1055 for translation into an APDU format. The APDUs are then sent 1420 to a Security Module 1425 for encryption. The encrypted APDUs are then routed 1430 to a Pipe Server 1070 for encapsulation into outgoing messaging and sent 1410 to the communications programs 1105S for transmission over the communications pipe 1075, through the network 1045 into the network interface 1130C of the Client 1010.

The incoming messages are then routed 1440 to Communications Programs 1105C for processing. Following processing, the messages are sent 1450 to a Pipe Client 1015 for separation of the encapsulated APDUs. The APDUs are then sent 1460 through a hardware device port 1005 assigned to a PSD Interface 1025. PSD Interface 1025 routes the incoming APDUs into the PSD 1040 via connection 1030, where it is subsequently decrypted and processed within its secure domain 1035.

Referring to FIG. 11, once PSD 1040 has processed the authentication challenge within its secure domain 1035, an authentication response message is generated using a pre-established cryptography method. The authentication response is sent in APDU format from PSD 1040 through connection 1030 and into PSD interface 1025. The PSD secure response is then routed 1570 through hardware device port 1005 and sent 1560 to the Pipe Client 1015 for processing and encapsulation. The resulting message packets are then sent 1550 to the Client-side Communications Programs 1105C for processing, encryption using a pre-established secure communications protocol and incorporation into outgoing message packets 1540. The message packets 1540 containing the encapsulated APDUs are transmitted 1075 over the network 1045 via network interface card (I/O) 1130C.

The secure hub 1050 receives the message packets 1535 containing the encapsulated APDUs from the network 1045 via network interface card (I/O) 1130S. The incoming messages are processed and decrypted using the pre-established cryptography method employed in the secure communications protocol by the server-side Communications Programs 1105S and routed 1510 into the Pipe Server 1070 for secure APDU extraction. The extracted secure APDUs are sent 1530 to the Security Module 1525 for decryption of the secure APDUs using the pre-established cryptography method. The decrypted APDUs are then routed 1520 to the APDU Interface 1055 for processing and translation into a higher-level format and sent 1500 to API Level programs 1100 for processing. Authentication Module 1065 within the secure hub 1050 remains inactive during the transfer of authentication information. The authentication response message is then routed 1085 into the Communications Programs 1105S where the response is sent over the network 1045 in a pre-established secure communications protocol to the challenging subsequent Remote Computer System 1150.

The incoming response message is decrypted and sent to an Authentication Module 1095. If authentication is successful, the subsequent Remote Computer System 1150 allows access to secure functions or data. If authentication fails, the end user will be unable to access secure functions or data.

5.2.2. Second Variant of Authentication Method

Referring to FIG. 12 depicts a second variant of the authentication method where the Remote Computer System 1050 transfers copies of the PSD credentials C 1035, if not pre-existing on said Remote computer System 1050. To perform credential transfer, an initial authentication transaction is performed by the Remote Computer System 1050 as previously described. Following authentication, additional commands are sent by the Remote Computer System 1050 to transfer the specified credentials.

The credentials are generated using a pre-established cryptography method and sent in APDU format from PSD 1040 through connection 1030 and into PSD interface 1025. The PSD secure response is then routed 1670 through hardware device port 1005 and sent 1660 to the Pipe Client 1015 for processing and encapsulation. The resulting message packets are then sent 1650 to the Client-side Communications Programs 1105C for processing, encryption using a pre-established secure communications protocol and incorporation into outgoing message packets 1640. The message packets 640 containing the encapsulated APDUs are transmitted 1075 over the network 1045 via a network interface card (I/O) 1130C.

The Remote Computer System 1050 receives the message packets 1635 containing the encapsulated APDUs from the network 1045 via network interface card (I/O) 1130S installed on the Remote Computer System.

The incoming messages are processed and decrypted using the pre-established cryptography method employed in the secure communications protocol by the server-side Communications Programs 1105S and routed 1610 into the Pipe Server 1070 for secure APDU extraction. The extracted secure APDUs are sent 1630 to the Security Module 1625 for decryption of the secure APDUs using the pre-established cryptography method. The decrypted APDUs are then routed 1620 to the APDU Interface 1055 for processing and translation into a higher-level format and sent 1600 to API Level programs 1100 for processing and subsequently sent 1605 to the Authentication Module 1065 for secure storage and future use. The transferred authentication information is shown in FIG. 12 as C'.

In FIG. 13, an authentication challenge 1085 is sent by a subsequent Remote Computer System 1150 over a network 1045. The Remote Computer System 1050 acting as a secure hub receives the incoming challenge 1085 from the network 1045 via network interface card 1130S installed on the Remote Computer System 1050. The incoming challenges 1085 are processed and decrypted using the pre-established cryptography method employed in the secure communications protocol by the server-side Communications Programs 1105S and routed to API Level programs 1100 for processing. The processed challenge is then sent 1705 to the Authentication Module 1065 for authentication using the PSD's transferred credentials C' 1035'. The communications pipe 1075 may remain intact during this process to allow for other transactions to occur.

Referring to FIG. 14, the secure hub 1050 generates an authentication reply within the Authentication Module 1065 which is sent 1805 to the API Level Programs 1100 for processing, and subsequently routed 1810 to the Server-side Communications Programs 1105S for processing, encryption using a pre-established secure communications protocol and incorporation into outgoing message packets. The message packets are routed over the network 1045 to the challenging subsequent Remote Computer System 1150. The incoming messages are then decrypted and the authentication reply processed by an internal authentication module 1095. If authentication is successful, the subsequent Remote Computer System 1150 allows access to secure functions or data. If authentication fails, the end user will be unable to access secure functions or data.

5.3. Method and System for Remote Activation and Management of PSDs

The need for secure network communications is paramount for sensitive business and government transactions. The present invention provides an improvement over the current art by allowing issuance of generic PSDs, which can be activated and customized at a later date.

The steps involved in activating a PSD and performing subsequent information management through a communications pipe are shown in FIGS. 15 through 17. For purposes of demonstration, it should be assumed that any local authentications between the end user, Client and local network domain have already been accomplished. Preferentially, a secure communications protocol is employed over the network between the client and one or more Remote Computer Systems. It is understood to one skilled in the art, that either embodiment of the invention will work with or without the use of secure communications protocols.

Referring now to FIG. 15A, a first embodiment of the invention is depicted where a Client 2010 and a connected PSD 2040 are connected over a network 2045 with a Remote Computer System 2050 using a communications pipe 2075 as described in previous section 5.1. The Remote Computer System 2050 maintains the communications pipe 2075 and is available to transfer proprietary information "I" 2165 through the communications pipe 2075 and into the PSD 2040.

In FIG. 15B, a second embodiment of the invention is depicted where a first Remote Computer System 2050 acting as a secure hub as described in previous section 5.2. provides a mechanism for a subsequent Remote Computer System 2150 connected 2085 to a network 2045 to transfer proprietary information "I'" 2165' into a PSD 2040. In this second embodiment of the invention, proprietary information 2165' is received and processed by a first Remote Computer System 2050. The proprietary information 2165' is then sent by the first Remote Computer System 2050, through the communications pipe 2075 and into the PSD 2040.

The network 2045 may be a common network as in a virtual private networking arrangement or separate networks such as private intranet and public internet arrangements. No limitation is intended in the number of PSDs 2040 and clients 2010 forming communications pipes 2075 with one or more Remote Computer Systems 2050, 2150; nor should any limitation on the number of Remote Computer Systems 2050, 2150 available for transferring proprietary information 2165, 2165' be construed from any of the depictions shown herein.

End user authentication is optional for activating blank PSDs or for deactivating PSDs already in use. In instances where access to a previously personalized PSD is desired, authentication transactions may be required as described in previous section 5.2. to facilitate secure access to the PSD. Once the authentication process has been accomplished, changes to proprietary information contained within the secure domain of the PSD are accomplished using the equivalent methodology described for blank card activation.

Proprietary information 2165, 2165' for injection into a PSD may originate on a Remote Computer system 2050 supporting a communications pipe (first embodiment of the invention), on subsequent Remote Computer Systems 2150 (second embodiment of the invention), or on any combination of Remote Computer Systems.

Referring to FIG. 16, this drawing illustrates the transfer of proprietary information from a storage location over a network into a PSD using the Remote Computer System supporting the communications pipe (first embodiment of the invention). This drawing is applicable for either activating a blank PSD or changing information in an active PSD subsequent to authentication. In this first embodiment of the invention, the proprietary information 2165 is called from its storage location 2160 within the Remote Computer System 2050.

After retrieval, the proprietary information 2165 is sent 2206 for processing into APDU format and encapsulation into the proper communications messaging format 2204 as described in previous section 5.1. After processing, the communications message 2204 is sent through the network interface 2130S, into the communications pipe 2075 over network 2045 and received by the client 2010 via a complementary network interface 2130C.

The incoming communications messages are sent 2212 for processing where the APDU formatted information is separated as described in previous section 5.1. The separated APDUs are then routed 2216 through the hardware device port 2005 and into 2218 the PSD device interface 2025. The incoming APDUs are then routed 2030 into the secure domain 2035 of the PSD 2040 where the information is processed and stored by at least one embedded algorithm.

For newly issued PSDs lacking proprietary information, the embedded algorithm is installed by the PSD issuer and functions to manage the initial installation of proprietary information. For PSDs already containing proprietary information, the algorithm may be the same or a different algorithm, which may include cryptographic capabilities.

Referring to FIG. 17, this drawing illustrates the transfer of proprietary information from a remote storage location 1160' over a network 2045 and injection into a PSD 2040 using a plurality of remote computer systems 2050, 2150. This second embodiment of the invention involves retrieving proprietary information 2165' from one or more 2150 remote computer systems, sending 2085 the proprietary information over a network 2045 where the proprietary information is received and processed by a first Remote Computer System 2050 which is supporting a communications pipe 2075 and injected into the secure domain 2035 of the PSD 2040.

This second embodiment of the invention is applicable for either activating a blank PSD or changing information in an active PSD subsequent to authentication. In instances where authentication is required, the Remote Computer System supporting the communications pipe may operate as a secure hub as described in previous section 5.2.

In this second embodiment of the invention, the proprietary information 2160' is called from a storage location inside a subsequent Remote Computer System 2150 or another Remote Computer System, which is local to, and communicating with, the subsequent Remote Computer System 2150. The proprietary information "I'" 2165' is retrieved and sent 2085 over the network 2045 to the Remote Computer System 2050 supporting the communications pipe 2075 with the designated PSD 2040.

Remote Computer System 2050 receives the proprietary information through the network interface 2130 and routes the incoming proprietary information 2165' for processing it 2302 into APDU format and encapsulation into the proper communications messaging format 2304 as described in previous section 5.1. After processing, the message 2304 is sent through the network interface 2130S, into the communications pipe 2075 over network 2045 and received by the client 2010 via a complementary network interface 2130C.

The incoming communications messages are sent 2312 for processing in 2314 where the APDU formatted information is separated as described in previous section 5.1. The separated APDUs are then routed 2316 through the hardware device port 2005 and into 2318 the PSD interface 2025. The incoming APDUs are then routed 2030 into the secure domain 2035 of the PSD 2040 where the information is processed and stored by at least one embedded algorithm.

As previously described, for newly issued PSDs lacking proprietary information, the embedded algorithm is installed by the PSD issuer and functions to manage the initial installation of proprietary information. For PSDs already containing proprietary information, the algorithm may be the same or a different algorithm, which may include cryptographic capabilities.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that the scope of the invention be limited by this Detailed Description, but rather by the Claims following herein.

What is claimed is:

1. A method for activating and/or managing at least one Personal Security Device with at least a first Remote Computer System over a first network using at least one Client as a host to said at least one Personal Security Device, comprising:
    retrieving proprietary information by said at least first Remote Computer System from a remote storage location;
    establishing at least one communications pipe over said first network between said at least one Personal Security Device and said at least first Remote Computer System;
    transmitting said proprietary information from said at least first Remote Computer System to said at least one Personal Security Device through said at least one communications pipe by:
        generating a request including said proprietary information on said Remote Computer System,
        converting on said first remote computer system said request into Personal Security Device-formatted messages, wherein the Personal Security Device-formatted messages are readable by the at least one Personal Security Device,
        encapsulating on said first remote computer system said Personal Security Device-formatted messages producing encapsulated messages,
        incorporating said encapsulated messages into outgoing message packets,
        transmitting said message packets over said first network using a packet based communications protocol,
        receiving by said client said message packets sent over said first network,
        processing said message packets on said client to extract said Personal Security Device-formatted messages, and
        routing, on said client, said Personal Security Device-formatted messages, through a hardware device port assigned to a Personal Security Device Interface which is in processing communication with said Personal Security Device, to a secure domain of said Personal Security Device, wherein the Personal Security Device-formatted messages are not modified by the client;
    processing the Personal Security Device-formatted messages at the at least one Personal Security Device to extract the proprietary information; and
    storing the proprietary information in the at least one Personal Security Device.

2. The method according to claim 1, further comprising:
    encrypting said proprietary information in said at least first Remote Computer System after retrieving the proprietary information and before transmitting said proprietary information; and
    decrypting said proprietary information in said at least one Personal Security Device processing said proprietary information.

3. The method according to claim 1, wherein said remote storage location is in said at least first Remote Computer System.

4. The method according to claim 1, wherein said remote storage location is in an at least one subsequent Remote Computer System functionally connected to said at least first Remote Computer System over a second network, wherein said step of retrieving proprietary information comprises the step of transmitting proprietary Information from said at least one subsequent Remote Computer System to said at least first Remote Computer System through said second network.

5. The method according to claim 4, further comprising:
    encrypting said proprietary information in said at least one subsequent Remote Computer System; and
    decrypting said proprietary information in said at least first Remote Computer System.

6. The method according to claim 1, further comprising authenticating said at least one Personal Security Device vis-a-vis said at least first Remote Computer System through said at least one communications pipe.

7. A Client for activating and/or managing at least one Personal Security Device with at least a first Remote Computer System over a first network using said Client as a host to said at least one Personal Security Device, wherein said Client comprises a device to receive proprietary information sent from said Remote Computer System to said at least one Personal Security Device through at least one established communications pipe, said device comprising:
    a network interface for receiving message packets sent over said first network, wherein said message packets include a request including said proprietary information converted into Personal Security Device-formatted messages, wherein the Personal Security Device-formatted messages are readable by the at least one Personal Security Device;
    a processor for extracting said Personal Security Device-formatted messages from said message packets; and
    a hardware device port assigned to a Personal Security Device Interface which is in processing communication with said Personal Security Device, for routing said extracted Personal Security Device-formatted messages to a secure domain of said Personal Security Device, wherein the Personal Security Device-formatted messages are not modified by the Client, wherein the Personal Security Device receives and processes the Personal Security Device-formatted messages to extract the proprietary information and stores the proprietary information in the Personal Security Device.

8. A Personal Security Device activation and/or management system, comprising at least one Client according to claim 7 and at least a first Remote Computer System functionally connected to said at least one Client through said at least one communications pipe,
    wherein said first Remote Computer System comprises:
    a storage device to store proprietary information;
    a processor for generating a request including said proprietary information, converting said request into Personal Security Device-formatted messages, encapsulating said Personal Security Device-formatted messages producing encapsulated messages and incorporating said encapsulated messages into outgoing message packets; and
    a network interface for sending said outgoing message packets over said first network to said at least one Client.

9. The Personal Security Device activation and/or management system according to claim 8, further comprising at least one subsequent Remote Computer System functionally connected to said at least first Remote Computer System through a second network, wherein said at least one subsequent Remote Computer System comprises a transmission device to transmit said proprietary information to said at least first Remote Computer System through said second network.

10. The Personal Security Device activation and/or management system according to claim 9, wherein said at least one subsequent Remote Computer System comprises an encryption device to encrypt said proprietary information, and wherein said at least one first Remote Computer System comprises a decryption device to decrypt said proprietary information.

11. The Personal Security Device activation and/or management system according to claim 9, wherein said first and second networks form one same network.

12. A method for managing a personal security device, comprising:
   retrieving, by a remote computer system, proprietary information from a remote storage location;
   establishing a communications pipe over a network between the personal security device and the remote computer system;
   generating, at the remote computer system, a personal security device-formatted (PSD-formatted) message that includes the proprietary information, wherein the PSD-formatted message is readable by the personal security device;
   generating, at the remote computer system, an encapsulated message that encapsulates the PSD-formatted message;
   transmitting the proprietary information from the remote computer system to the personal security device through the communications pipe by:
      transmitting the encapsulated message to a client device;
      processing, at the client device, the encapsulated message to extract the PSD-formatted message; and
      routing the PSD-formatted message to the personal security device, wherein the PSD-formatted message is not modified by the client device;
   processing, at the personal security device, the PSD-formatted message to extract the proprietary information; and
   storing the proprietary information in the personal security device.

13. The method according to claim 12, wherein at least a portion of the PSD-formatted message is unreadable by the client device.

14. The method according to claim 12, wherein the proprietary information is not disclosed to the client device.

15. The method according to claim 12, further comprising:
   encrypting the proprietary information at the remote computer system; and
   decrypting the proprietary information at the personal security device.

16. The method according to claim 12, wherein the remote storage location is in the remote computer system.

17. The method according to claim 12, wherein the remote computer system is a first remote computer system, and wherein retrieving the proprietary information includes transmitting the proprietary information from a second remote computer system that is coupled to the first remote computer system via the network.

18. The method according to claim 12, further comprising:
   authenticating the personal security device using information transmitted to the remote computer system through the communications pipe.

19. The method according to claim 12, wherein the communications pipe is initiated by the remote computer system.

20. The method according to claim 12, wherein the communications pipe is initiated by a second remote computer system requesting access to the personal security device.

21. The Client according to claim 7, wherein the communications pipe is initiated by the at least one first Remote Computer System.

22. The Client according to claim 7, wherein the communications pipe is initiated by a second Remote Computer System requesting access to the Personal Security Device.

23. The method according to claim 1, wherein the communications pipe is initiated by the at least one first Remote Computer System.

24. The method according to claim 1, wherein the communications pipe is initiated by a second Remote Computer System requesting access to the Personal Security Device.

25. The method according to claim 1, wherein the proprietary information is not disclosed to the client device.

26. The client according to claim 7, wherein the proprietary information is not disclosed to the client device.

* * * * *